(12) United States Patent
Sugimoto

(10) Patent No.: US 8,736,689 B2
(45) Date of Patent: May 27, 2014

(54) IMAGING APPARATUS AND IMAGE PROCESSING METHOD

(75) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 764 days.

(21) Appl. No.: 13/016,280

(22) Filed: Jan. 28, 2011

(65) Prior Publication Data

US 2011/0234834 A1    Sep. 29, 2011

(30) Foreign Application Priority Data

Mar. 25, 2010    (JP) ................. 2010-069315

(51) Int. Cl.
*H04N 5/228*    (2006.01)
*H04N 5/232*    (2006.01)

(52) U.S. Cl.
CPC .................... *H04N 5/232* (2013.01)
USPC .................................................. 348/208.14

(58) Field of Classification Search
CPC ............... G06T 2207/10016; G06T 7/2033; G06K 9/3241; H04N 5/232; H04N 5/23248; H04N 5/23219
USPC ............... 348/208.4, 208.6, 208.12, 208.14, 348/208.16, 222.1, 345, 363, 221.1; 382/103
See application file for complete search history.

(56) References Cited

U.S. PATENT DOCUMENTS

| | | | |
|---|---|---|---|
| 8,395,671 B2 * | 3/2013 | Kimura | 348/208.14 |
| 2004/0240707 A1 * | 12/2004 | Aliaga et al. | 382/103 |
| 2008/0095402 A1 * | 4/2008 | Kochi et al. | 382/103 |
| 2008/0095436 A1 * | 4/2008 | Kim et al. | 382/173 |
| 2010/0007763 A1 * | 1/2010 | Yokohata | 348/222.1 |
| 2010/0027847 A1 * | 2/2010 | Ess et al. | 382/107 |
| 2010/0128927 A1 * | 5/2010 | Ikenoue | 382/103 |
| 2010/0231731 A1 * | 9/2010 | Motomura et al. | 348/208.4 |
| 2010/0246901 A1 * | 9/2010 | Yang | 382/107 |
| 2010/0322474 A1 * | 12/2010 | Cheriyadat et al. | 382/103 |
| 2011/0157379 A1 * | 6/2011 | Kimura | 348/208.2 |

FOREIGN PATENT DOCUMENTS

| | | |
|---|---|---|
| JP | 2007-142507 A | 6/2007 |
| JP | 2007-183256 A | 7/2007 |

* cited by examiner

*Primary Examiner* — Aung S Moe
(74) *Attorney, Agent, or Firm* — Birch, Stewart, Kolasch & Birch, LLP

(57) ABSTRACT

To track the movement of a common subject contained in a sequence of image frames time-sequentially captured by a digital camera, feature points of the subject are extracted from a first image frame, and corresponding points to the extracted feature point are identified in a second image frame that is captured after the first image frame. When the number of traceable feature points, to which the corresponding points can be identified, is less than a predetermined value, the speed of movement of the subject is judged high, and the shutter speed of the digital camera is set at a higher value.

20 Claims, 21 Drawing Sheets

IMAGING APPARATUS AND IMAGE PROCESSING METHOD

FIELD OF THE INVENTION

The present invention relates to an imaging apparatus that detects movement of a common target object contained in a plurality of time-sequentially captured images on the basis of image data of these images. The present invention relates also to an image processing method.

BACKGROUND OF THE INVENTION

An imaging apparatus is known in the art that detects movement of a common target object or subject contained in a plurality of time-sequentially captured images by extracting several feature points of the subject from one of these images and then extracting corresponding feature points from other images to track these feature points.

For example, JPA No. 2007-142507 discloses a teaching of extracting feature points from a sequence of images and calculating motion vectors of the extracted feature points, to correct image blurs by correcting image-clipping positions from the respective images and then averaging the clipped images. JPA No. 2007-183256 discloses extracting multiple feature points from an image captured by an imaging apparatus and then extracting corresponding feature points from another image captured immediately before or after the above-mentioned image. Tracking the respective feature points in this way makes it possible to measure the position or posture of the imaging apparatus or determine coordinates of a target object accurately even while the imaging apparatus is shaking.

However, conventional methods of tracking the movement of a subject by identifying corresponding feature points of the subject between successive images of the subject generally has a problem that the corresponding feature points can be difficult to find if the subject or target object moves so fast that the consequent images suffer motion blur and thus have reduced contrast. The above-mentioned prior arts do not provide any solution for this problem that can occur when the subject moves at a high speed.

SUMMARY OF THE INVENTION

The present invention is provided to solve the above problem; the object of the present invention is to provide a solution for making it possible to follow the course of movement of a common subject contained in images successively captured by an imaging apparatus, even if the subject movement is so fast that it is difficult to extract corresponding feature points of the subject from these images.

According to an aspect of the present invention, an imaging apparatus that can drive an image sensor to capture a series of image frames time-sequentially comprises a feature point extracting device, a feature points tracking device, and a movement judging device. The feature point extracting device extracts a plurality of feature points from a first image frame captured through the image sensor, and the feature points tracking device tracks the feature points extracted by the feature point extracting device by identifying corresponding points to the extracted feature points in a second image frame captured before or after the first image frame. The movement judging device judges whether the speed of movement of a common subject contained in the first and second image frames is high or low, depending upon the number of traceable feature points to which the feature point tracking device can identify the corresponding points, or the number of untraceable feature points to which the feature point tracking device cannot identify the corresponding points.

The movement judging device may judge that the speed of movement of the subject is high when the number of traceable feature points is not more than a predetermined value.

Alternatively, the movement judging device may judge that the speed of movement of the subject is high when the number of untraceable feature points is not less than a predetermined value.

The movement judging device may also judge that the speed of movement of the subject is high when the percentage of the number of untraceable feature points is not less than a predetermined value, or when the percentage of the number of traceable feature points is not more than a predetermined value.

Preferably, the imaging apparatus further comprises an imaging condition changing device that changes the imaging condition of the imaging apparatus to be appropriate for a moving subject when the movement judging device judges that the subject is moving fast.

The imaging condition changing device may raise the shutter speed or the frame rate of the image sensor up to a value appropriate for a moving subject when the movement judging device judges that the subject is moving fast.

The imaging condition changing device may set the imaging apparatus to an image-capturing mode appropriate for a moving subject, or a continuous shooting mode for recording still images in continuous succession upon a command to take a shot, when the movement judging device judges that the subject is moving fast.

Where the imaging apparatus comprises an AF control device having different operation modes with different focusing speeds, the imaging condition changing device may set the AF control device to a mode that achieves a higher focusing speed when the movement judging device judges that the subject is moving fast.

Where an AE control device of the imaging apparatus has a through-image photometry AE mode for controlling an exposure based on a photometric value that has been obtained from a through-image displayed at the moment or immediately before an instruction to take a shot is entered, the imaging condition changing device may set the AE control device to the through-image photometry AE mode when the movement judging device judges that the subject is moving fast.

Preferably, the movement judging device calculates motion vectors of the traceable feature points, and judges whether the speed of movement of the subject is high or low on the basis of the magnitude of at least one of the motion vectors in addition to the number of traceable feature points or the number of untraceable feature points.

The movement judging device may judge that the speed of movement of the subject is high when the magnitude of the motion vector is not less than a predetermined value even if the speed of movement of the subject can be judged low with respect to the number of traceable feature points or the number of untraceable feature points.

The movement judging device may also judge that some occlusion occurs when the magnitude of the motion vector is less than a predetermined value and the number of traceable feature points is not more than a predetermined value.

Preferably, the movement judging device weights the traceable or untraceable feature points with values predetermined according to respective locations of these feature points within each image frame, and integrates the weighted values of the feature points, to judge whether the speed of movement of the subject is high or low on the basis of an integral weight of the feature points.

Thus, the movement judging device can judge the movement of the subject while giving priority to those feature points which are located in the image area of interest.

Another aspect of the present invention provides an image processing method for tracking the movement of a common subject contained in a series of time-sequentially captured image frames on the basis of image data of the image frames. The image processing method comprising steps of extracting a plurality of feature points of the subject from a first one of the series of image frames; identifying corresponding points to the extracted feature point in a second image frame that is captured before or after the first image frame; and judging whether the speed of movement of the common subject is high or low, depending upon the number of traceable feature points to which the corresponding points can be identified, or the number of untraceable feature points to which the corresponding points cannot be identified.

According to the present invention, even if the subject moves so fast that the corresponding points are difficult to identify, it is possible to determine that the speed of movement of the subject is high. In that case, by adjusting the imaging condition of the imaging apparatus to the rapidly moving subject, the imaging apparatus will be able to capture such image frames that contain the moving subject with greater sharpness.

BRIEF DESCRIPTION OF THE DRAWINGS

The above and other objects and advantages of the present invention will be more apparent from the following detailed description of the preferred embodiments when read in conjunction with the accompanied drawings, wherein like reference numerals designate like or corresponding parts throughout the several views, and wherein.

DESCRIPTION OF THE PREFERRED EMBODIMENTS

Figure 1:
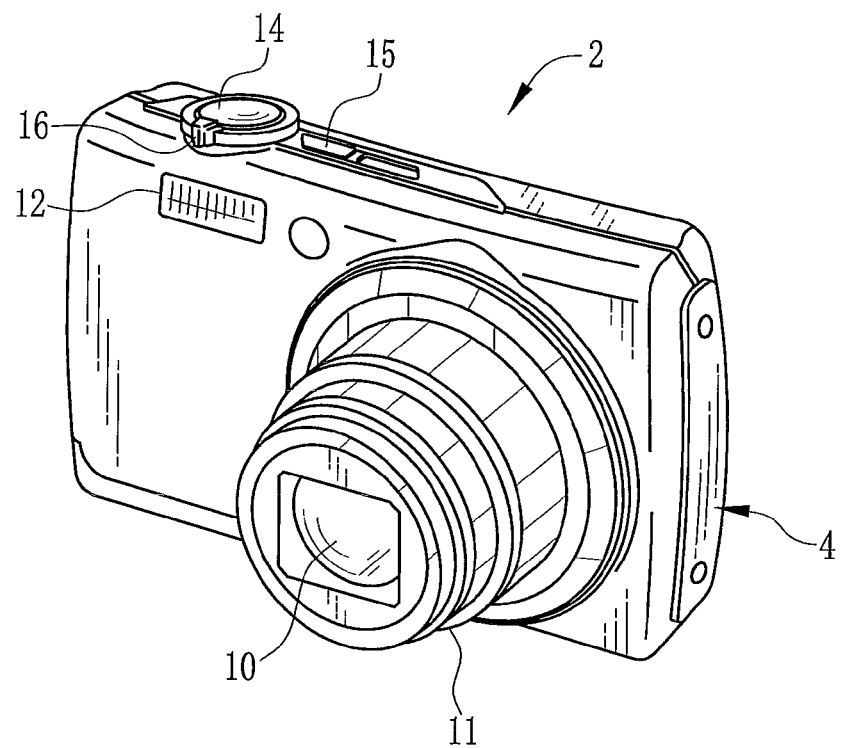
FIG. 1 is a front perspective view of a digital camera.

As shown in FIG. 1, a digital camera 2 (image display apparatus) 2 has a camera body 4 of a substantially rectangular prism shape. The camera body 4 has a front side provided with a lens barrel 11 holding a taking lens 10 therein, and a flash projector 12 for illuminating a subject. On a top side of the camera body 4 are provided a shutter release button 14 for giving an instruction to take a shot, a power button 15 for turning a power source ON and OFF, and a zoom lever 16 for zooming the taking lens 10 toward a wide-angle side or a telephoto side.

The shutter release button 14 is such a two-step switch that has a half-pressed position for causing the digital camera 2 to execute preparatory operations, such as auto-focusing (AF) and auto-exposure control (AE), to prepare for a shot. When the shutter release button 14 is farther pressed to a full-pressed position, the instruction to capture an image is given to the digital camera 2. Then the digital camera 2 converts an image signal of a picture frame, as captured based on the preparatory operations, to an image data file.

Figure 2:
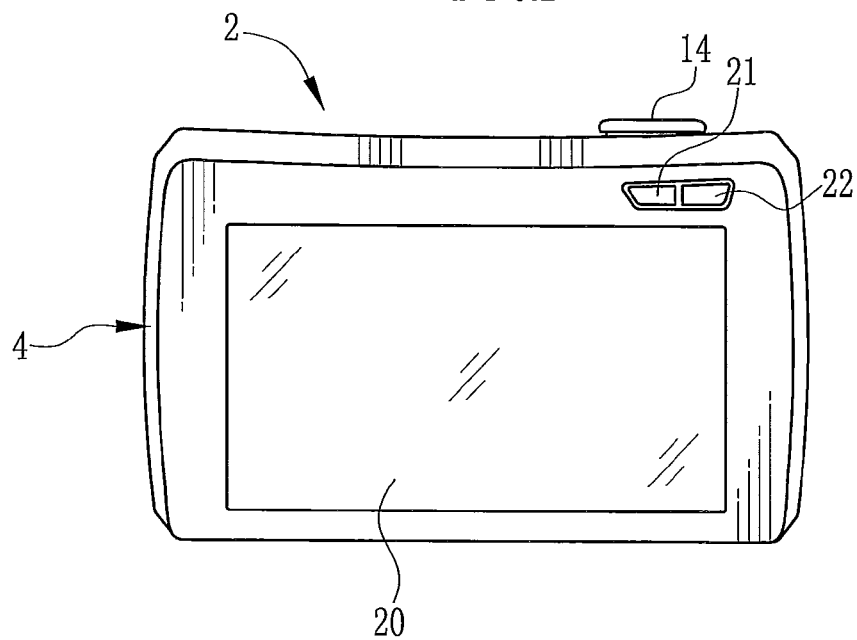
FIG. 2 is a rear view of the digital camera.

As shown in FIG. 2, the camera body 4 has an LCD display 20, a mode selection button 21 and a menu button 22 on its rear side. The LCD 20 displays captured images, a so-called through-image or viewfinder image during a standby stage, and a variety of menu screens. The digital camera 2 has many operation modes, including a still image capturing mode for capturing still images, a moving image capturing mode for capturing moving images, and a reproduction mode for reproducing captured images on the LCD 20. The mode selection button 21 is operated to switch the operation modes of the digital camera 2. For example, the operation modes are changed over one after another each time the mode selection button 21 is pressed down. The menu button 22 is operated to cause the LCD 20 to display the setup menus.

Figure 3:
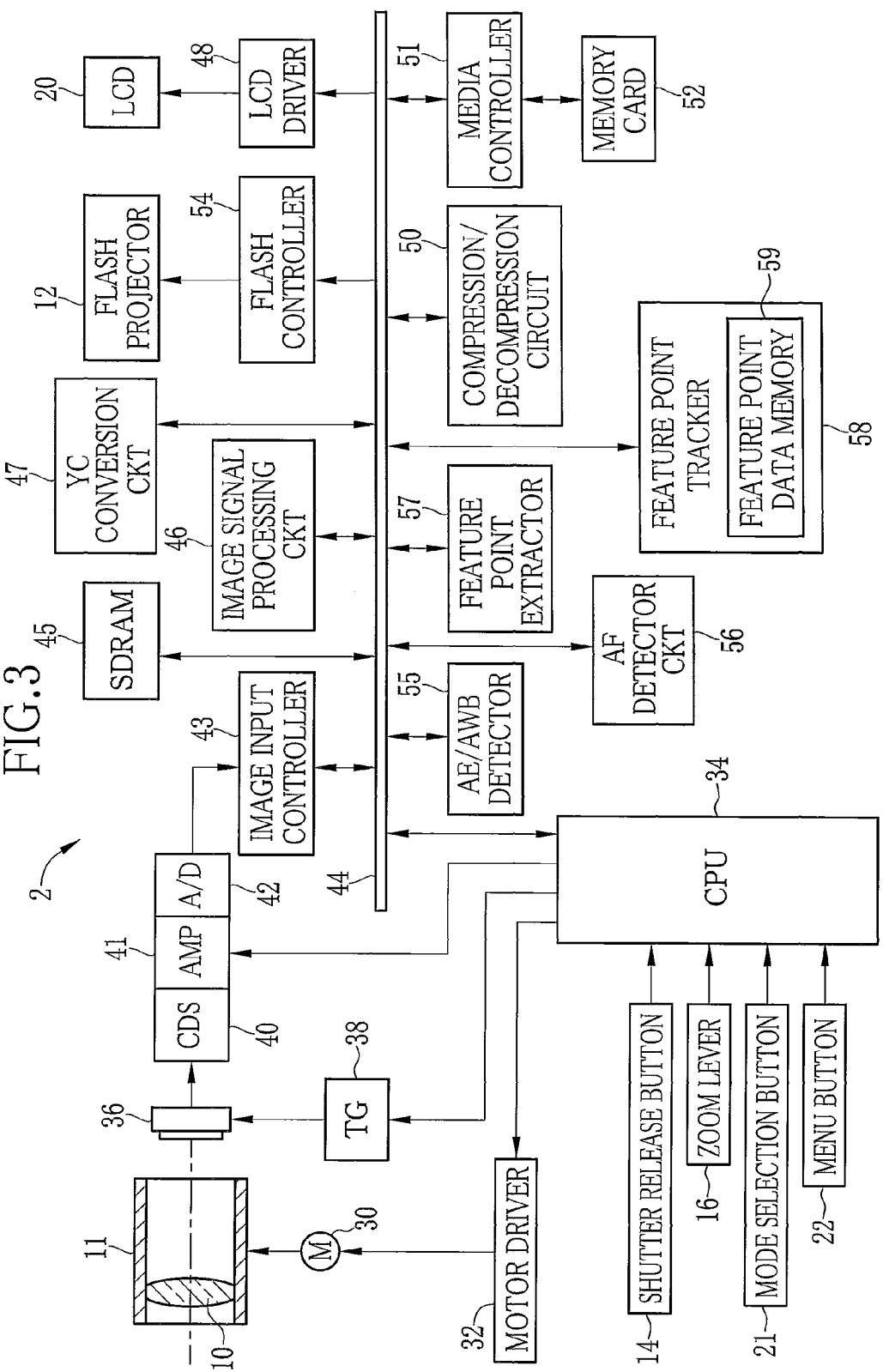
FIG. 3 is a schematic block diagram illustrating the circuitry of the digital camera.

As shown in FIG. 3, the lens barrel 11 is connected to a motor 30. The motor 30 supplies driving power to the lens barrel 11 through a transmission mechanism such as a gear mechanism, driving the lens barrel 11 move forward and rearward. Although FIG. 3 schematically shows the taking lens 10 as a single element, the taking lens 10 is a lens group composed of multiple lens elements, spacing between the lens elements being variable according to the lens barrel movement to change the lens magnification. Besides the optics for changing the magnification, the taking lens 10 also includes a stop mechanism for changing the stop aperture size to adjust the light amount traveling through the taking lens 10, and a focusing lens that can move along the optical axis for adjusting the focus of the taking lens 10.

The motor 30 is coupled to a motor driver 32. The motor driver 32 is connected to a CPU (a movement judging method, a setup changer, an AF controller and an AE controller) 34 that supervises the overall operation of the digital camera 2, so that the motor driver 32 feeds drive pulses to the motor 30 according to a control signal from the CPU 34. The motor 30 turns its rotary shaft in response to the drive pulses.

Behind the taking lens 10 is disposed a CCD (charge-coupled device) 36 for converting an optical image of a subject formed through the taking lens 10 to electronic image data. The CCD 36 is connected to a timing generator (TG) 38 that is controlled by the CPU 34 to output a timing signal or clock pulses to the CCD 36. The clock pulses determine electronic shutter speed and frame rate of the CCD 36.

The electronic shutter speed and the frame rate are respectively selectable from predetermined set values. The user may choose any values on a menu screen that appears on the LCD 20 in response to an operation on the menu button 22. The CPU 34 controls the timing generator 38 to drive the CCD 36 according to the shutter speed and frame rate selected by the user.

The image signal from the CCD 36 is fed to a correlated double sampling (CDS) circuit 40, to be converted to analog RGB image data that exactly corresponds to charges accumulated in respective cells of the CCD 36. The RGB image data from the CDS circuit 40 is amplified by an amplifier (AMP) 41 and then converted to digital image data through an A/D converter 42.

An image input controller 43 is connected to the CPU 34 via a bus 44, to control the CCD 36, the CDS 40, the AMP 41 and the A/D 42 according to control commands from the CPU 34. The image data from the A/D 42 is temporarily stored in a SDRAM 45.

An image signal processing circuit 46 reads out the image data from the SDRAM 45, to process it for gradation conversion, white balance correction, gamma correction, and other various kinds of image processing, and writes back the processed image data in the SDRAM 45. An YC conversion circuit 47 reads out the image data processed at the image signal processing circuit 46 from the SDRAM 45, and converts it into a luminance signal Y and chrominance signals Cr and Cb.

An LCD driver 48 reads out the image data from the SDRAM 45, after being processed and converted through the image signal processing circuit 46 and the YC conversion circuit 47, and converts the image data to an analog composite signal for displaying a corresponding image on the LCD 20. Thus, the captured image data at the CCD 36 is displayed on the LCD 20 as the through image.

In a compression/decompression circuit 50, the image data as converted into the YC signals through the YC conversion circuit 47 is converted into a compressed file format of a still image file or a moving image file. A media controller 51 makes an access to a memory card 52 that is removably inserted into a not-shown media slot of the digital camera 2, to write the still image file 54 on the memory card 52 or read some still image files from the memory card 52.

The CPU 34 is connected to many kinds of operating members, including the shutter release button 14, the zoom lever 16, the mode selection button 21, and the menu button 22. These operating members individually detect operations done by the user and output a signal corresponding to the detected operation to the CPU 34.

The buss 44 interconnects a flash controller 54, an AE/AWB detector circuit 55, an AF detector circuit 56, a feature point extractor 57 and a feature point tracker 58 in addition to the above-mentioned components. The flash controller 54 controls the flash projector 12 to emit a flash of light according to a flash signal from the CPU 34.

The AE/AWB detector circuit 55 calculates a light value representative of the brightness of the subject on the basis of a product of the luminance signal Y and the chrominance signals Cr and Cb of the image data converted at the YC conversion circuit 47, and transfers the light value to the CPU 34. Based on the light value from the AE/AWB detector circuit 55, the CPU 34 checks whether the exposure value and white balance of the image are proper or not, to control the stop mechanism of the taking lens 10 and the CCD 36 to adjust the exposure value accordingly.

The AE/AWB detector circuit 55 also calculates a photometric value from image data of one frame of the through image, each time it receives the image data of one frame. The photometric value is sent to the CPU 34. Upon receipt of the photometric value from the AE/AWB detector circuit 55, the CPU 34 carries out the above-described AE process. Consequently, the digital camera 2 continues to control the exposure value in the standby stage where the through image is displayed on the LCD 20 and the outcome is reflected in the through image.

In the digital camera 2, the user may choose between a standard AE mode and a through-image photometric AE mode on the menu screen. In the standard AE mode, the AE/AWB detector circuit 55 restarts calculating a photometric value when the shutter release button 14 is fully pressed down to give an instruction to take a shot, and image data is captured and recorded under an exposure condition determined on the basis of the photometric value. In the through-image photometric AE mode, the AE process uses a photometric value that was obtained immediately before the instruction to take a shot is given. Thus, the through-image photometric AE mode can reduce a time lag from the release operation to the actual shooting, which will result from the time taken for calculation of the photometric value. The user may choose any AE modes on the menu screen that appears on the LCD 20 in response to an operation on the menu button 22.

The AF detector circuit 56 calculates a focus gauging value for the taking lens 10 on the basis of the digital image data from the A/D 42, and outputs the calculation result to the CPU 34. In the preparatory operations responsive to the half-press of the shutter release button 14, the AF detector circuit 56 calculates the focus gauging value, and on the basis of the focus gauging value, the CPU 34 executes autofocusing according to a contrast detection method, to bring the taking lens 10 to an in-focus position.

Figure 4:
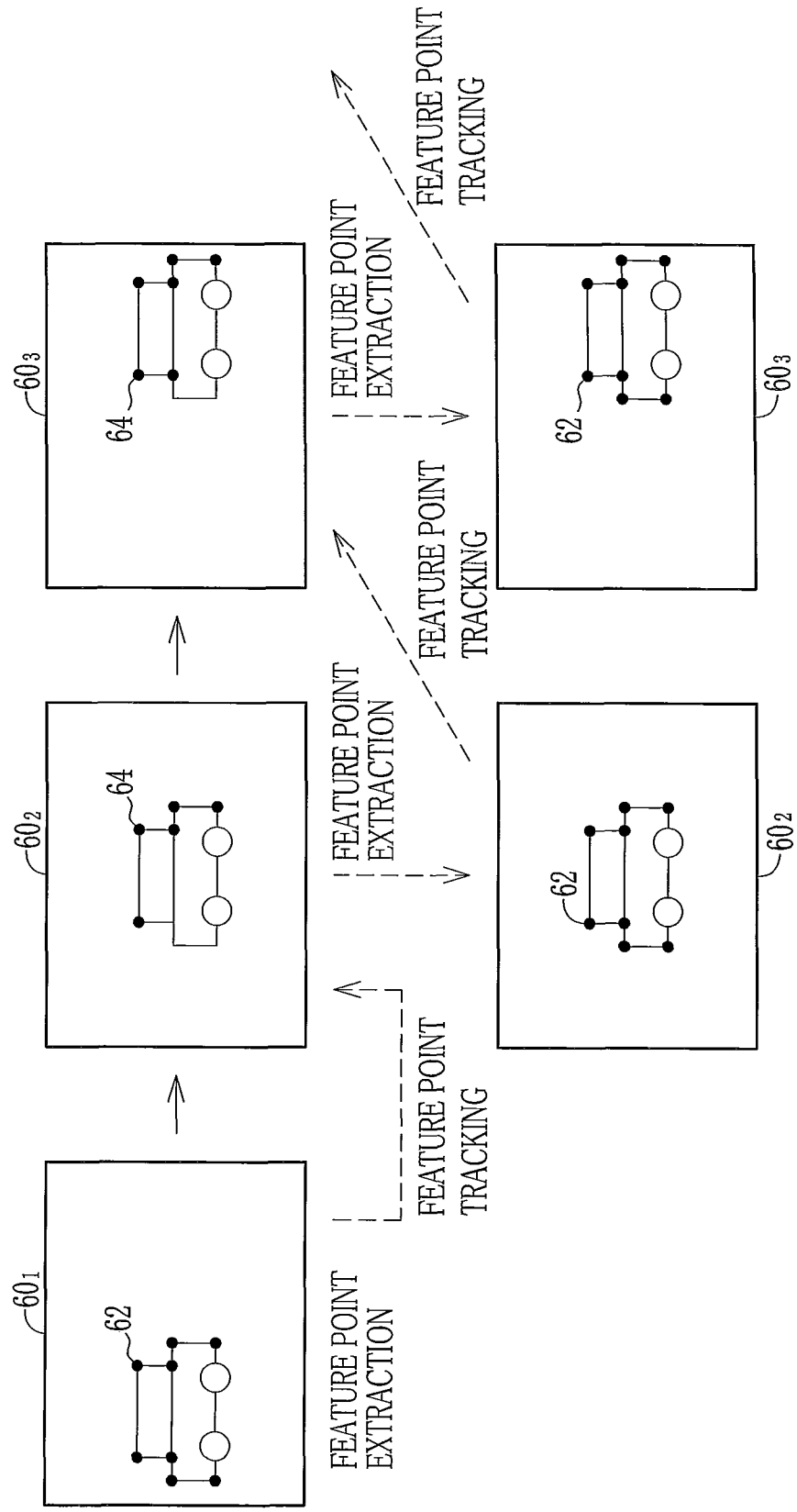
FIG. 4 is an explanatory diagram schematically illustrating processes for extracting and tracking feature points of a target in the digital camera.

The feature point extractor 57 reads out the image data, as converted through the YC conversion circuit 47, from the SDRAM 45 under the control of the CPU 34. The feature point extractor 57 then extracts a plurality of feature points 62 from image data of an image frame 60, as shown in FIG. 4. The feature point 62 is an easy distinguishable point from other points of the subject in the image frame 60, for example, a corner with a brightness gradient.

After extracting the feature points, the feature point extractor 57 inputs feature point data about the extracted feature points 62 to the feature point tracker 58. The feature point data includes, for example, the position of pixels constituting each particular feature point 62 and pixel values of these feature point pixels and surrounding pixels. The feature point extracting process by the feature point extractor 57 may include any of known methods such as written in the above-mentioned patent documents.

The feature point tracker 58 is provided with a feature point data memory 59 that stores the feature point data from the feature point extractor 57. On receiving the feature point data from the feature point extractor 57, the feature point tracker 58 writes the feature point data in the feature point data memory 59.

When image data of a succeeding image frame 60 is obtained, while the feature point data being stored in the feature point data memory 59, the feature point tracker 58 reads out the YC converted image data of the succeeding image frame from the SDRAM 45 under the control of the CPU 34. Thereafter, the feature point tracker 58 analyzes the image data of the succeeding image frame 60 to identify those points 64 corresponding to the respective feature points 62 which are represented by the feature point data stored in the feature point data memory 59, thereby to track and trace the feature points 62 in the succeeding image frame. The feature point tracker 58 may use a known method such as template matching for this feature point tracking process.

After carrying out the feature point tracking process, the feature point tracker 58 produces data of the identified corresponding points 64 and inputs the data of the corresponding points 64 to the CPU 34. Like the feature point data, the corresponding point data indicates the position of pixels constituting each corresponding point 64 and pixel values of the corresponding point pixels and surrounding pixels.

Upon receipt of the data of corresponding points 64 from the feature point tracker 58, the CPU 34 counts the number of traceable feature points with reference to the data of the identified corresponding points 64; traceable feature points are those among the feature points 62 extracted in one frame, to which the feature point tracker 58 can find the corresponding points 64 in the succeeding image frame or frames. The CPU 34 then compares the number of traceable feature points with a predetermined value. The number of traceable feature point 62 tends to decrease with an increase in speed of movement of the subject, because motion blur can lower the image contrast. Therefore, the CPU 34 may determine that the speed of movement of the subject is high when the number of traceable feature points 62 is not more than the predetermined value.

On determining that the subject is moving fast, the CPU 34 sets the CCD 36 of the digital camera 2 up to the highest shutter speed regardless of the shutter speed the user has selected on the menu screen. Thus, the CPU 34 judges the speed of movement of the subject on basis of the number of traceable feature points 62, to change the setting condition of the camera 2 appropriately according to the subject movement speed.

Figure 5:
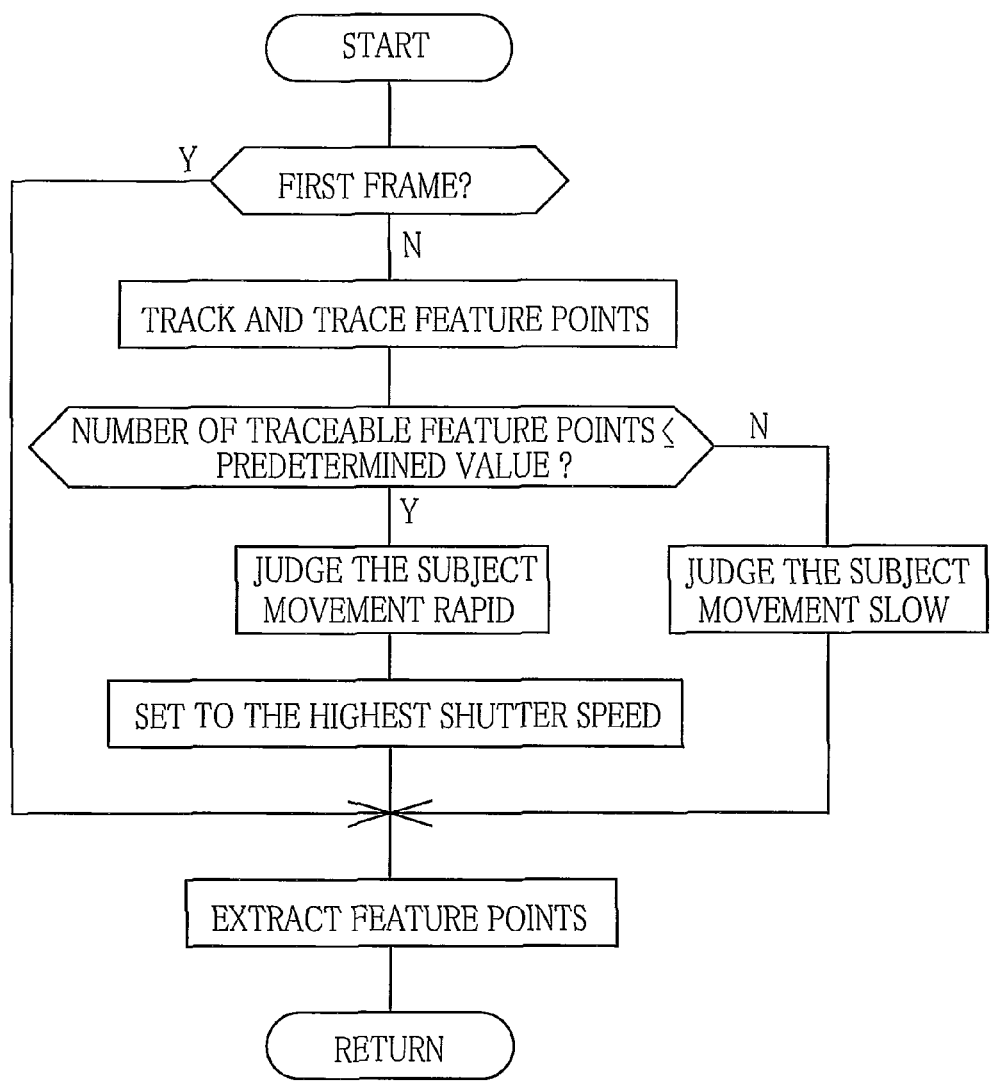
FIG. 5 is a flowchart illustrating a sequence of the feature point extracting and tracking processes in the digital camera, comparing the number of traceable feature points with a predetermined value.

Next, the operation of the above-described digital camera 2 will be described with reference to the flowchart shown in FIG. 5. In order to capture an image by the digital camera 2, the power button 15 should be pressed first to activate every part of the digital camera 2. Thereafter the mode selection button 21 is pressed down to select the still image capturing mode or the moving image capturing mode, bringing the digital camera 2 into the standby stage for a shot.

When the digital camera 2 comes into the standby stage, the timing generator 38 is controlled by the CPU 34, whereby the timing generator 38 outputs the timing signal to drive the CCD 36. In this case, the CPU 34 drives the CCD 36 according to the shutter speed and the frame rate selected by the user through the menu screen. The CCD 36 captures an image frame in response to the timing signal from the timing generator 38 and outputs the image signal according to the image of the subject provided by the taking lens 10.

The image signal from the CCD 36 is converted to the digital image data through the CDS 40, the AMP 41 and the A/D 42. After being processed through various image processing steps at the image signal processing circuit 46 and YC conversion processing at the YC conversion circuit 47, the digital image data is converted to the analog composite signal at the LCD driver 48 to display the captured image frame on the LCD 20 as a frame of the through image.

When the image data is obtained by driving the CCD 36, the CPU 34 determines whether the image data is of an initial or first image frame or not, simultaneously with the above described operation for displaying the image frame as the through image on the LCD 20. When the image data is of the first image frame $60_1$, the CPU 34 commands the feature point extractor 57 to execute the feature point extracting process to the image data.

In response to the command for the feature point extracting process from the CPU 34, the feature point extractor 57 reads out the YC converted image data of the first image frame from the SDRAM 45 and extracts multiple feature points 62 from the image data of the first frame $60_1$. After extracting the feature points 62, the feature point extractor 57 produces data of the feature points 62 and outputs the feature point data to the feature point tracker 58. The feature point tracker 58 writes the received feature point data in the feature point data memory 59.

When image data of a second image frame $60_2$ is obtained from the CCD 36, the CCD 34 commands the feature point tracker 58 to execute the feature point tracking process to the image data, while controlling displaying the second image frame $60_2$ as the through image on the LCD 20. On receiving the command for the feature point tracking process from the CPU 34, the feature point tracker 58 reads out the YC converted image data of the second frame $60_2$ from the SDRAM 45, and compares the read image data with the feature point data stored in the feature point data memory 59, i.e. the data of the feature points 62 extracted from the previous image frame $60_1$, to identify corresponding points 64 within the second frame $60_2$, which correspond to the feature points 62 extracted from the first frame $60_1$. After finding the respective corresponding points 64, the feature point tracker 58 feeds data of the corresponding points 64 to the CPU 34.

On the basis of the data of the corresponding points 64 from the feature point tracker 58, the CPU 34 determines whether the number of traceable feature points 62, to which corresponding points 64 can be found by the feature point tracker 58, is greater or smaller than a predetermined value. When the number of traceable feature points 62 is above the predetermined value, the CPU 34 judges that the subject movement is slow. On the other hand, when the number of traceable feature points 62 is equal to or smaller than the predetermined value, the CPU 34 judges that the speed of movement of the subject is high and then raises the shutter speed of the CCD 36 up to a maximum level. Thus, comparing the number of traceable feature points 62 with the predetermined value at least enables determining whether the speed of movement of the subject is high or low, even if the subject movement too rapid to find the corresponding points.

After judging whether the number of traceable feature points 62 is below or above the predetermined value and, if necessary, adjusting the shutter speed of the CCD 36, the CPU 34 commands the feature point extractor 57 to execute the feature point extracting process to the image data that has been subjected to the feature point tracking process by the feature point tracker 58, i.e. the image data of the second frame $60_2$ in this instance. The feature point extractor 57 extracts multiple feature points 62 from the second frame $60_2$, produces data of the extracted feature points 62 and inputs the produced feature point data to the feature point tracker 58 in the same procedures as for the previous frame.

On receipt of the feature point data from the feature point extractor 57, the feature point tracker 58 correspondingly revises the feature point data in the feature point data memory 59, deleting the previously stored feature point data and writing the new feature point data from the feature point extractor 57 in the feature point data memory 59. Thus, the CPU 34 updates the feature points 62 to be served for the feature point tracking process on the next frame, one frame after another, by extracting feature points from every image frame (see FIG. 4.).

And the CPU 34 repeats the above-described feature point extracting and tracking processes until an instruction to execute the preparatory operations is given by the half-press of the shutter release button 14, or an instruction to record an image is given by the full-press of the shutter release button 14, or an instruction to switch over to the reproduction mode is given by the press of the mode selection button 21.

Figure 6:
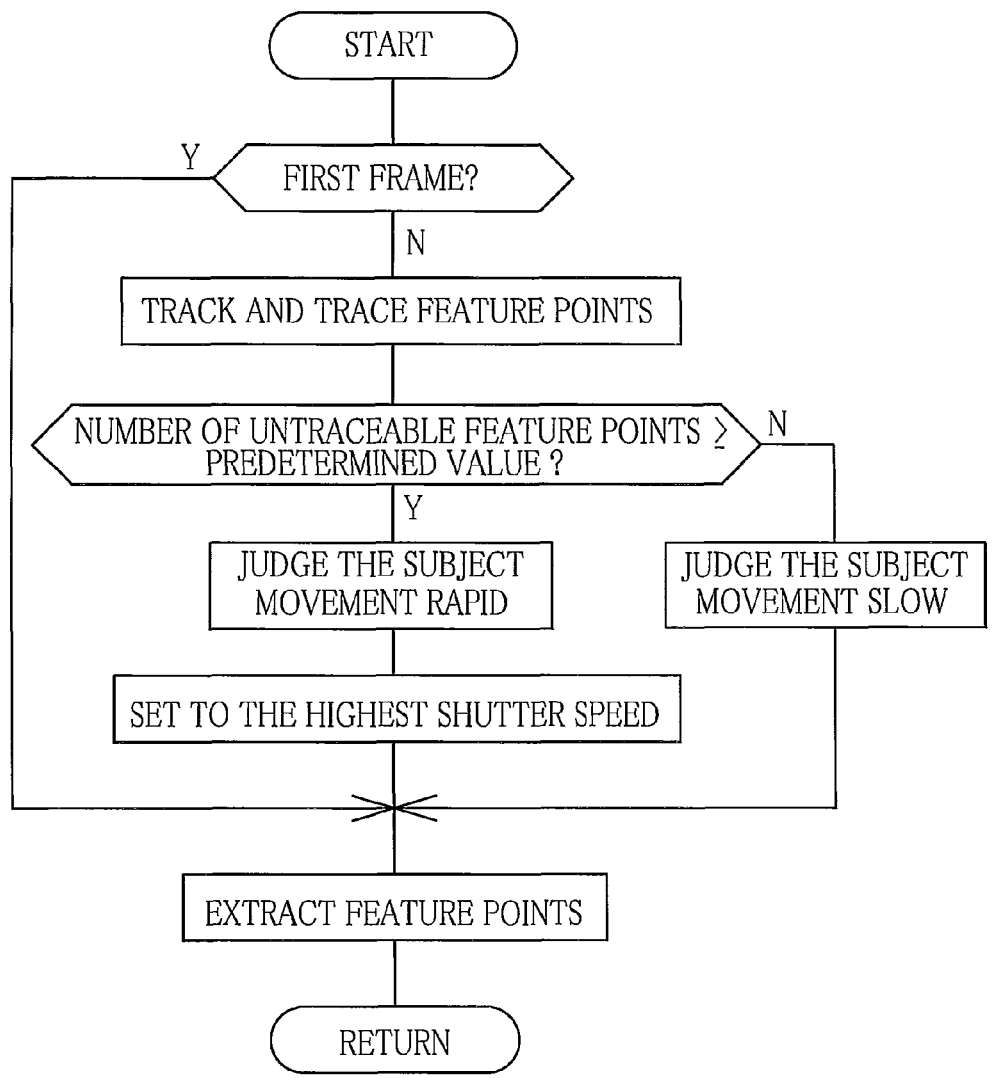
FIG. 6 is a flowchart illustrating another embodiment of feature point extracting and tracking processes, comparing the number of untraceable feature points with a predetermined value.

According to the above-described embodiment, the subject movement is determined to be rapid when the number of traceable feature points 62 is not more than the predetermined value. However, the present invention is not limited to this configuration. As shown in the flowchart of FIG. 6, it is possible to compare the number of untraceable feature points 62, to which the feature point tracker 58 cannot find any corresponding points 64, with a predetermined value, and determine that the speed of movement of the subject is high when the number of untraceable feature points is not less than the predetermined value.

Figure 7:
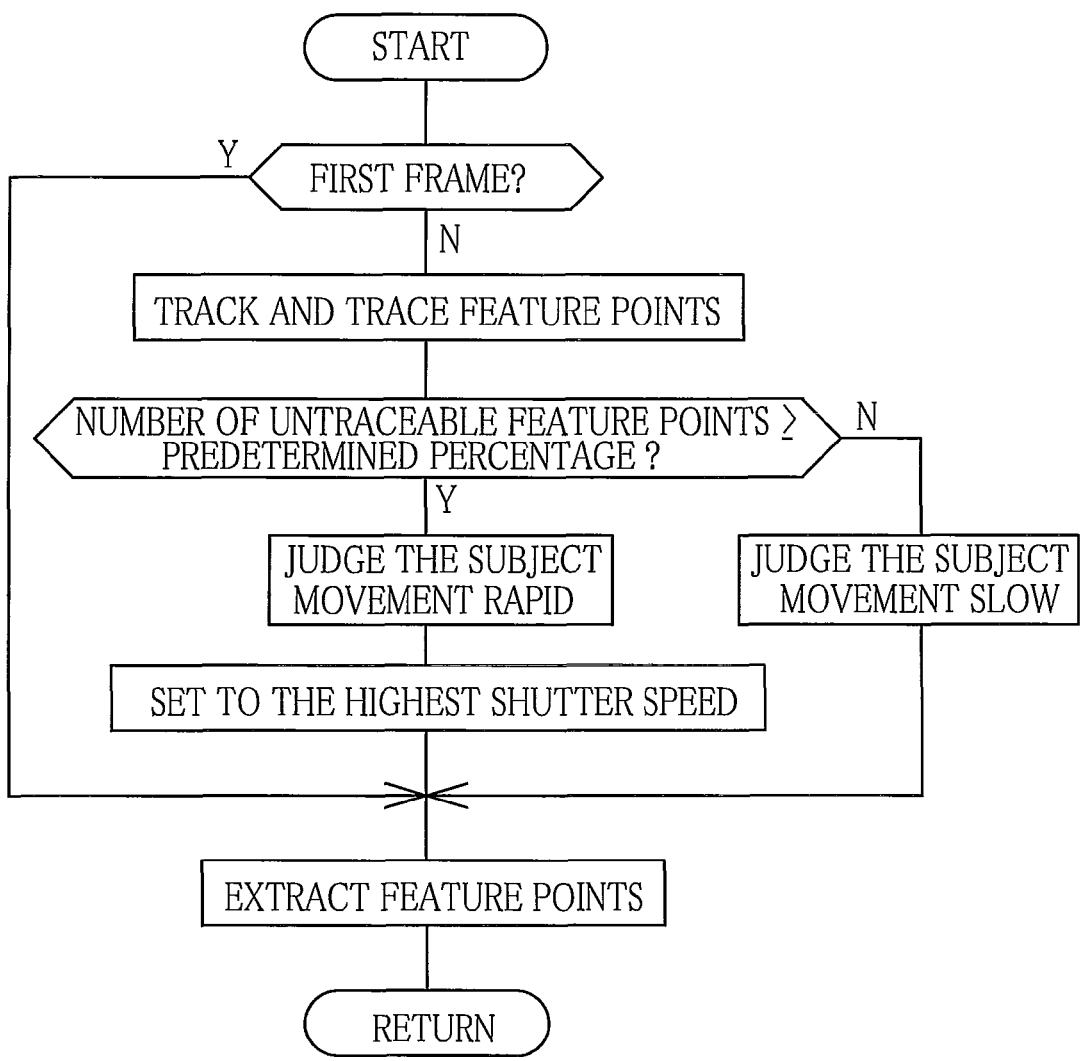
FIG. 7 is a flowchart illustrating an embodiment of feature point extracting and tracking processes, comparing the percentage of the number of untraceable feature points with a predetermined value.
Figure 8:
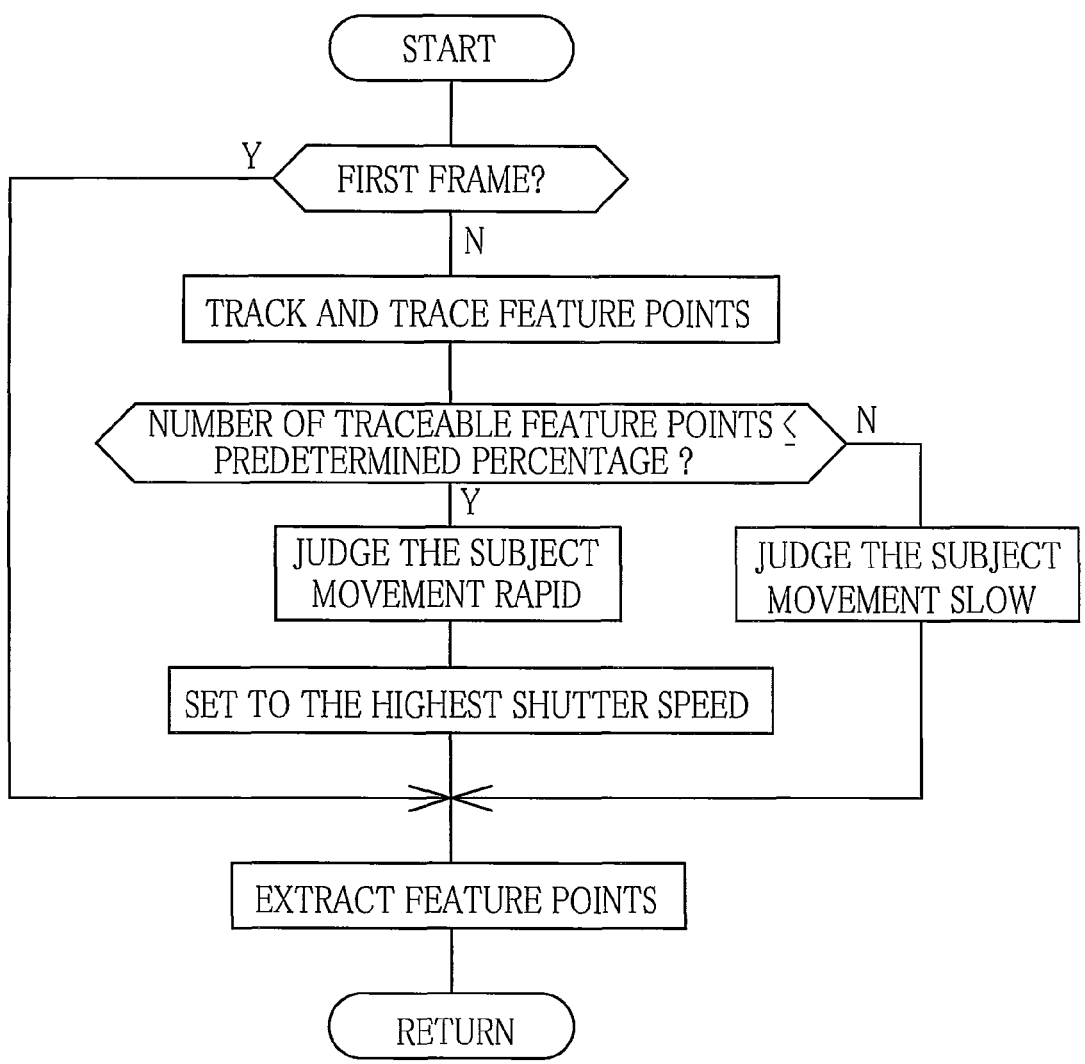
FIG. 8 is a flowchart illustrating an embodiment of feature point extracting and tracking processes, comparing the percentage of the number of traceable feature points with a predetermined value.

Moreover, as shown by the flowchart in FIG. 7, it is possible to detect the percentage of the number of untraceable feature points 62 to all of the feature points 62 indicated by the feature point data, i.e. the total number of feature points 62 extracted through the feature point extracting process, and compare the percentage with a predetermined value, to determine that the speed of movement of the subject is high when the percentage of the number of untraceable feature points is not less than the predetermined value. It is also possible to detect the percentage of the number of traceable feature points 62 to all of the extracted feature points 62 and compare the percentage with a predetermined value, to determine that the speed of movement of the subject is high when the percentage of the number of traceable feature points is not more than the predetermined value, as shown by the flowchart in FIG. 8.

Figure 9:
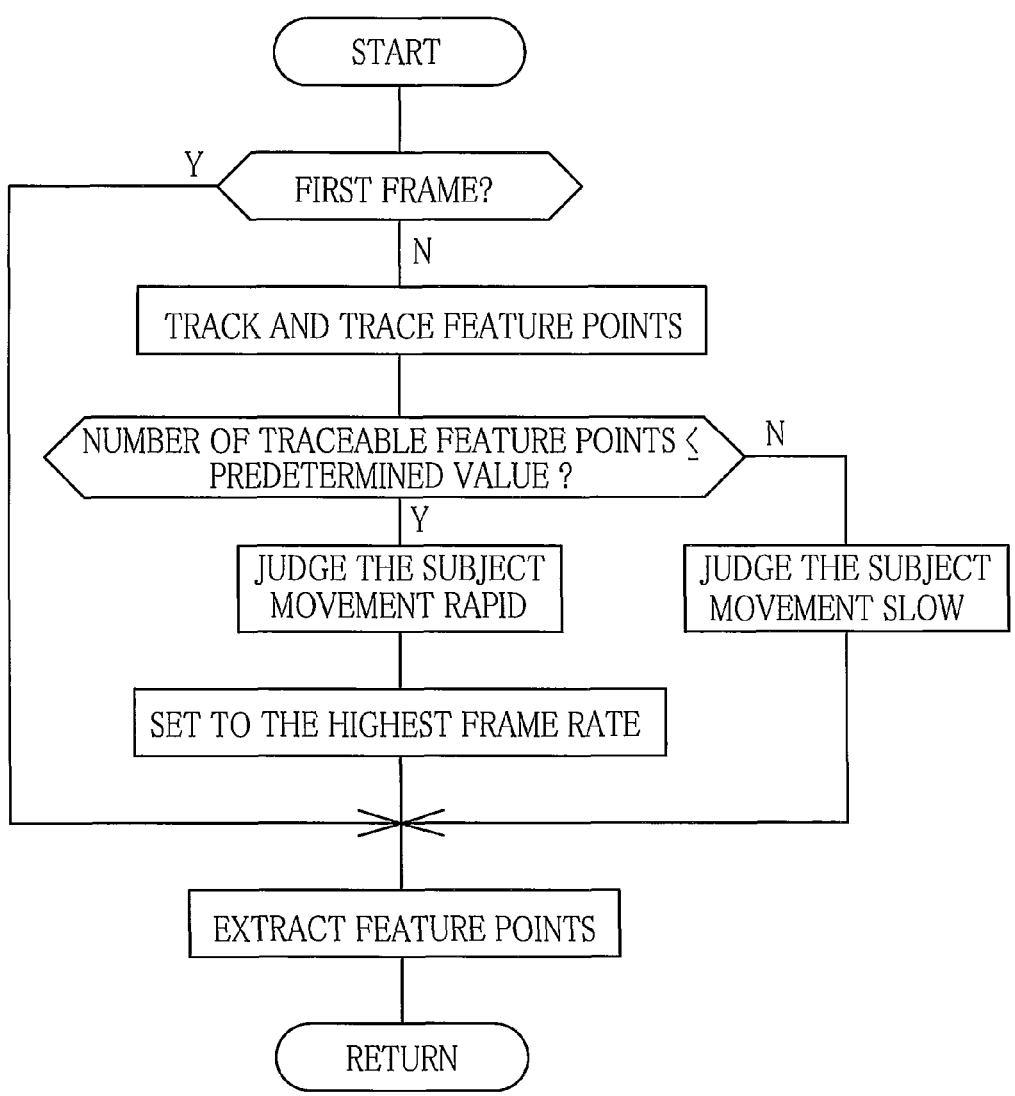
FIG. 9 is a flowchart illustrating an embodiment of feature point extracting and tracking processes, raising the frame rate upon judging that the subject is moving fast.

According to the above-described embodiments, the shutter speed is raised to an appropriate value for a moving subject when it is determined that the subject is moving fast. Alternatively, as shown for example in the flowchart of the FIG. 9, it is possible to raise the frame rate of the CCD 36 up to an appropriate value for a moving subject when it is determined that the subject is moving fast.

In the above-described embodiment, the shutter speed of the CCD 36 is set up to a maximum value upon judging that the subject is moving fast. Instead of setting the shutter speed at the maximum level, the shutter speed may be set one grade up above the current shutter speed that may be selected by the user through the menu screen. In the same way, instead of setting up the highest frame rate in the above-described embodiment, it is possible to raise the frame rate, for example, one grade up above the current frame rate selected by the user through the menu screen. Thus, the method of changing the shutter speed or the frame rate is not limited to the above-described embodiments. Any methods of raising the shutter speed or the frame rate are applicable to the feature point extracting and tracking processes.

And the setup of the shutter speed and the frame rate is applicable not to the through image but only to in capturing an image to obtain the still image file or the moving image file. It is also applicable to the through image.

Figure 10:
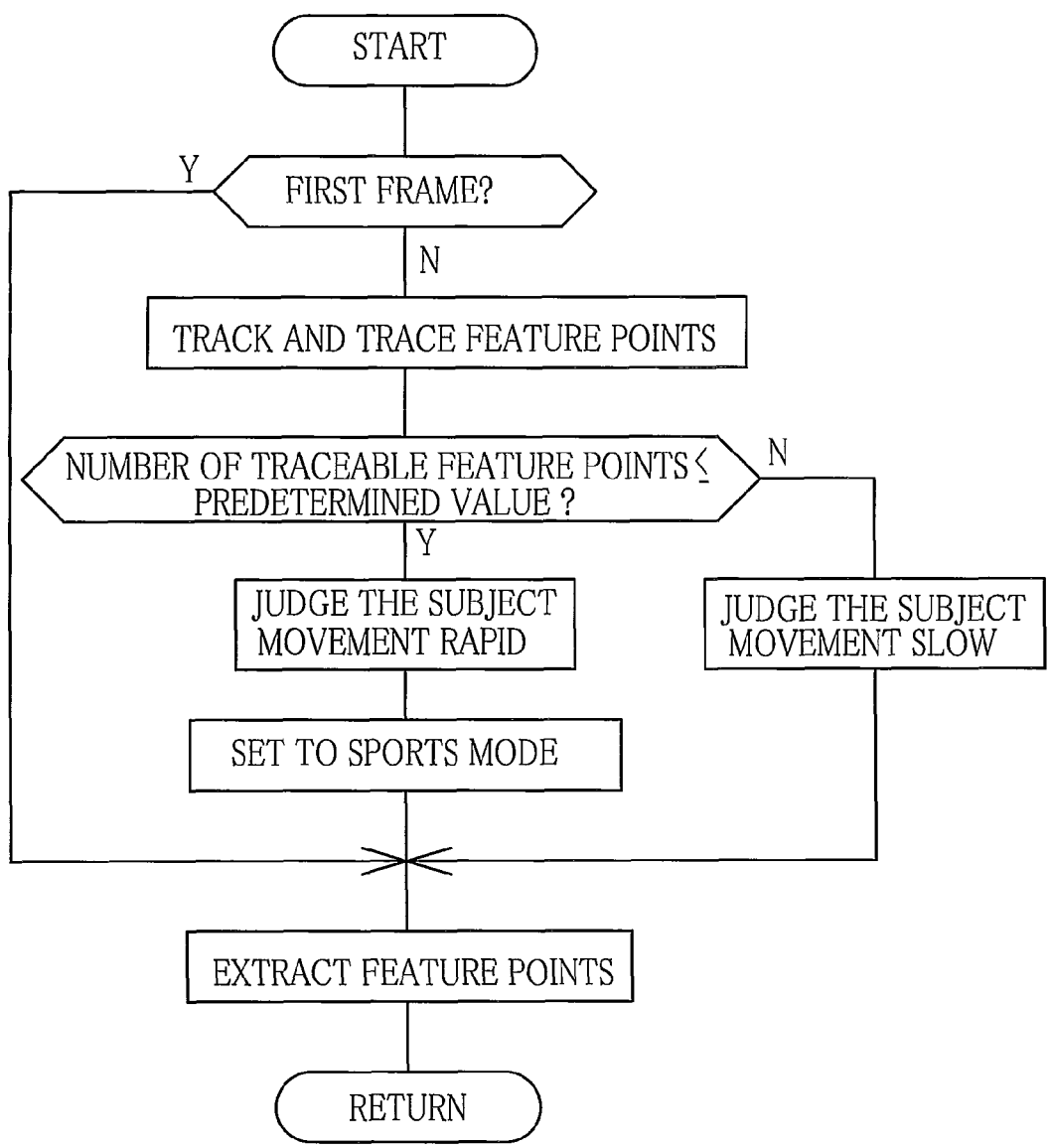
FIG. 10 is a flowchart illustrating an embodiment of feature point extracting and tracking processes, setting the camera to a sports mode upon judging that the subject is moving fast.

In an embodiment, a sports mode suitable for capturing an image of a moving subject may be included as one of image capturing modes of the digital camera 2. Then, the digital camera 2 may be set to the sports mode when it is determined that the subject is moving fast, as shown by the flowchart in FIG. 10. The sports mode is such an image capturing mode that enables capturing a clear image of a rapidly moving object or objects in a sports scene or the like, by totally adjusting setup values such as the shutter speed of the CCD 36 and the aperture size of the taking lens 10. However, any other image capturing modes suitable for capturing an image of a moving subject are usable instead of the sports mode when the subject movement is judged rapid.

Figure 11:
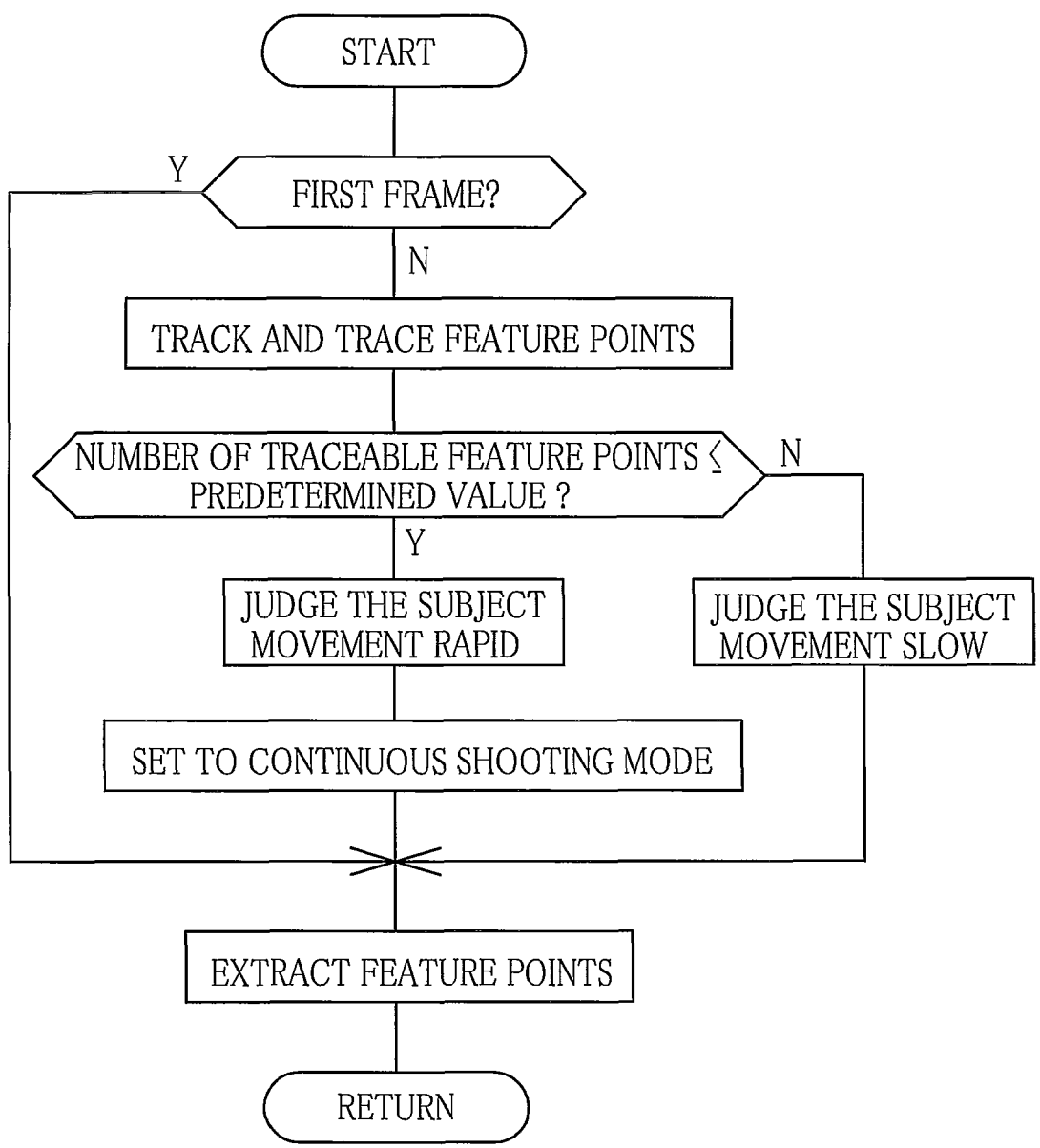
FIG. 11 is a flowchart illustrating an embodiment of feature point extracting and tracking processes, setting the camera to a continuous shooting mode upon judging that the subject is moving fast.

In another embodiment, it is possible to set the digital camera 2 to a continuous shooting mode when the subject movement is judged rapid, as shown in the flowchart of FIG. 11. In the continuous shooting mode, a series of time-sequential successive still image files are recorded by shooting the same subject a plurality of times at given intervals in response to one instruction to take a shot. Thus, even if the movement of the subject is quite rapid, the possibility of acquiring at least an adequate shot will increase; the user will be more likely to get a desired photo opportunity.

Furthermore, when the digital camera 2 is set to the sports mode or the continuous shooting mode or other suitable mode for capturing the moving subject after the speed of movement of the subject is determined high, it is preferable to record information about the selected special image capturing mode as tag data in each still or moving image file that is recorded in the special image capturing mode. The tag data is useful for identifying and sorting out the still or moving image files as those captured from rapidly moving subjects. Alternatively, the judgment itself may be written as tag data in each image file, indicating that the speed of movement of the subject is high.

Next, another embodiment of the present invention will be described with reference to the flowchart of FIG. 12 and the explanatory diagram of FIG. 13. Note that a digital camera in accordance with this embodiment may have the same structure as the first embodiment, so the respective components will be designated by the same reference numerals as the first embodiment in the following description.

In the same way as the first embodiment, when image data is obtained from a CCD 36, a CPU 34 processes the image data to display an image frame as the through image on the LCD 20. Simultaneously, the CPU 34 determines whether the image data is of an initial or first image frame or not. When the image data is of the first image frame $60_1$, the CPU 34 commands the feature point extractor 57 to execute the feature point extracting process.

In response to the command for the feature point extracting process from the CPU 34, the feature point extractor 57 reads out the YC converted image data of the first image frame from the SDRAM 45 and extracts multiple feature points 62 from the image data of the first frame $60_1$. After extracting the feature points 62, the feature point extractor 57 produces data of the feature points 62 and outputs the feature point data to the feature point tracker 58. The feature point tracker 58 writes the received feature point data in the feature point data memory 59.

When image data of a second image frame $60_2$ is obtained from the CCD 36, the CCD 34 commands the feature point tracker 58 to execute the feature point tracking process to the image data, while controlling displaying the second image frame $60_2$ as the through image on the LCD 20. On receiving the command for the feature point tracking process from the CPU 34, the feature point tracker 58 reads out the YC converted image data of the second frame $60_2$ from the SDRAM 45, and compares the read image data with the feature point data stored in the feature point data memory 59, to identify corresponding points 64 within the second frame $60_2$. After finding the respective corresponding points 64, the feature point tracker 58 feeds data of the corresponding points 64 to the CPU 34.

On the basis of the data of the corresponding points 64 from the feature point tracker 58, the CPU 34 determines whether the number of traceable feature points 62 is more than one or not. When the number of traceable feature points 62 is more than one, the CPU 34 judges that the subject movement is slow. On the other hand, when the number of traceable feature points 62 is not more than one, the CPU 34 judges that the subject is moving fast and then sets the shutter speed of the CCD 36 up to the highest level.

After judging whether the number of traceable feature points 62 is more than one or not and, if necessary, adjusting the shutter speed of the CCD 36, the CPU 34 judges whether the number of traceable feature points 62 is more than two or not. Determining that the number of traceable feature points 62 is not more than two, the CPU 34 commands the feature point extractor 57 to execute the feature point extracting process to the image data that has been subjected to the feature point tracking process by the feature point tracker 58. Then, the feature point extractor 57 extracts multiple feature points 62 from the second frame $60_2$, in this instance, and outputs data of the extracted feature points 62 to the feature point tracker 58. As a result, the feature point data stored in the feature point data memory 59 is revised.

On the other hand, when the CPU 34 determines that the number of traceable feature points 62 is more than two, the feature point extracting process is not executed on the second image frame.

Instead, the feature point data previously stored in the feature point data memory 59, i.e. the data of the feature points extracted from the first frame $60_1$ in this instance, is used for the next feature point tracking process which is executed on image data of a third image frame $60_3$ in this instance.

Figure 13:
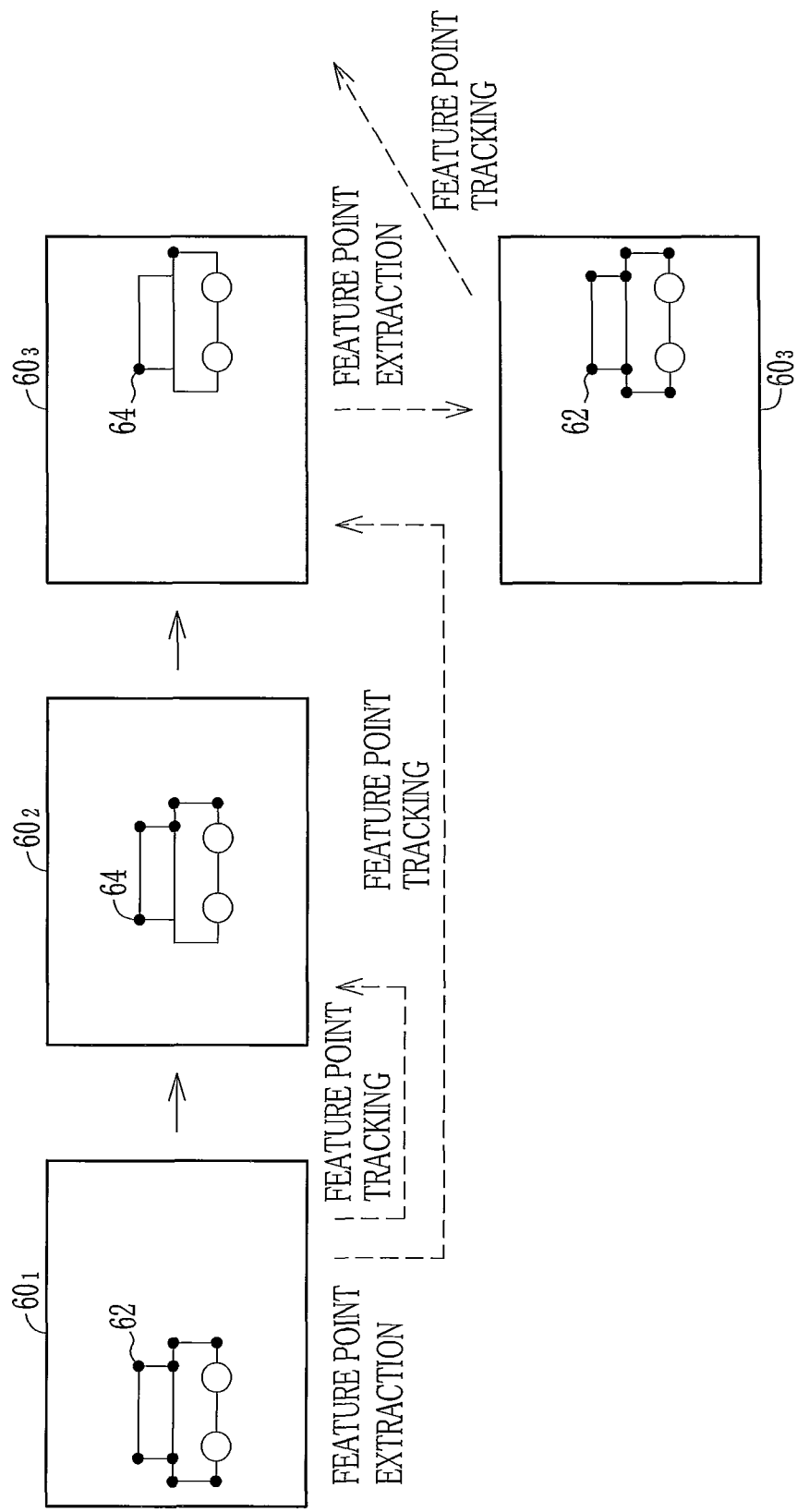
FIG. 13 is an explanatory diagram illustrating the embodiment of FIG. 12.

Thus, the feature point tracking process is executed on the following image frames with reference to the common feature point data so long as the number of traceable feature points 62 is more than two (see FIG. 13). According to this method, the correlation between the feature points 62 and the corresponding points 64 can be more clearly shown across many image frames, and hence the movement of the subject can be more accurately determined. Moreover, this method will reduce the processing burden on the CPU 34 and other members in comparison with the case where the feature point extraction is executed on every image frame.

Figure 12:
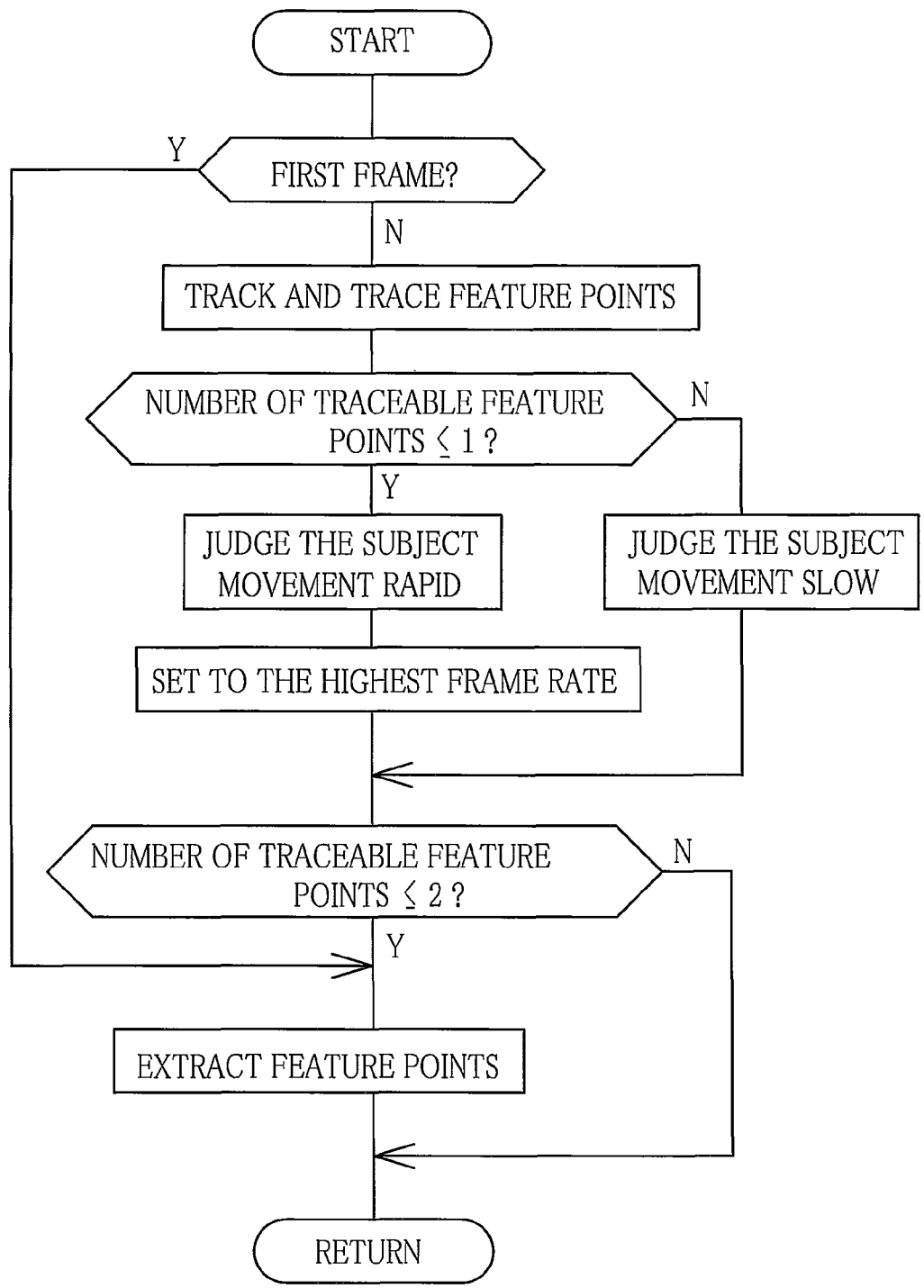
FIG. 12 is a flowchart illustrating an embodiment newly extracting feature points only when the number of traceable feature points is not more than a predetermined value.

In the embodiment of FIG. 12, the CPU 34 judges whether the number of traceable feature points 62 is more than one or not, and then whether the number of traceable feature points 62 is more than two or not. However, the criterial number for judgment based on the traceable feature points 62 is not limited to the above-mentioned numbers but may be any numbers.

Next, another embodiment of the present invention will be described with reference to a flowchart in FIG. 14 and an explanatory diagram in FIG. 15. The feature point extracting and tracking processes according to this embodiment are identical to those of the embodiment of FIG. 12 up to the stage of judging whether the number of traceable feature points 62 is more than two or not. Therefore, the explanation of the same processes will be omitted.

On judging that the number of traceable feature points 62 is not more than two, a CPU 34 gives a feature point extractor 57 an instruction to extract data of feature points from image data that has been subjected to the feature point tracking process at the feature point tracker 58, to rewrite feature point data in a feature point data memory 59 of a feature point tracker 58 with the newly extracted feature point data, in the same way as the above described embodiments.

On the other hand, when the CPU 34 determines that the number of traceable feature points 62 is more than two, the CPU 34 outputs data of corresponding points 64, which have been found through the preceding feature point tracking process, to the feature point tracker 58. Then, the feature point tracker 58 stores the data of the corresponding points as a new set of feature point data in the feature point data memory 59. It means that the corresponding points 64 found through the preceding feature point tracking process becomes the feature points 62 which are served for the succeeding feature point tracking process to the image data of the next image frame (see FIG. 15).

In the former depicted embodiment of FIGS. 12 and 13, data of previously detected feature points, which is stored in the feature point data memory 59, is continuously used for the feature point tracking process to the following image frames insofar as a sufficient number of corresponding points to these feature points are identified in the following image frames. This embodiment is effective to clarify the correlation between the initially extracted feature points 62 and the corresponding points 64 across the following image frames. However, as the amount of image variation from the initial image frame gradually increases one image frame after another because of accumulating motion blur. Consequently, as the feature point tracking process proceeds from one frame to another, the corresponding points 64 tend to remove away from the initially extracted feature points 62 and eventually get out of a tracking range for tracking a corresponding point to each feature point. Accordingly, the number of traceable feature points 62 tends to decrease one frame after another.

Figure 14:
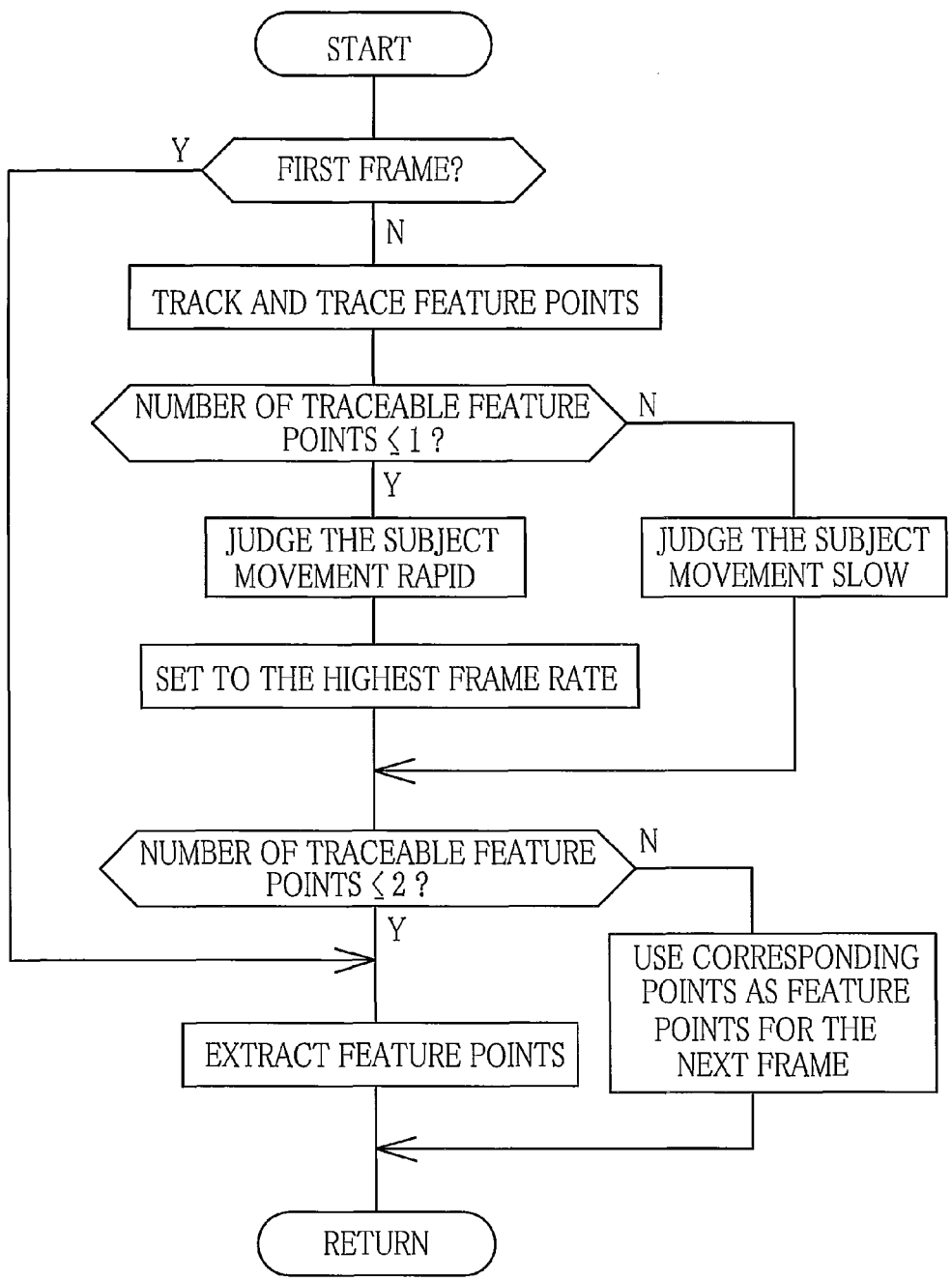
FIG. 14 is a flowchart illustrating an embodiment using corresponding points as feature points for the feature point tracking process in the next frame when the number of traceable feature points is more than a predetermined value.
Figure 15:
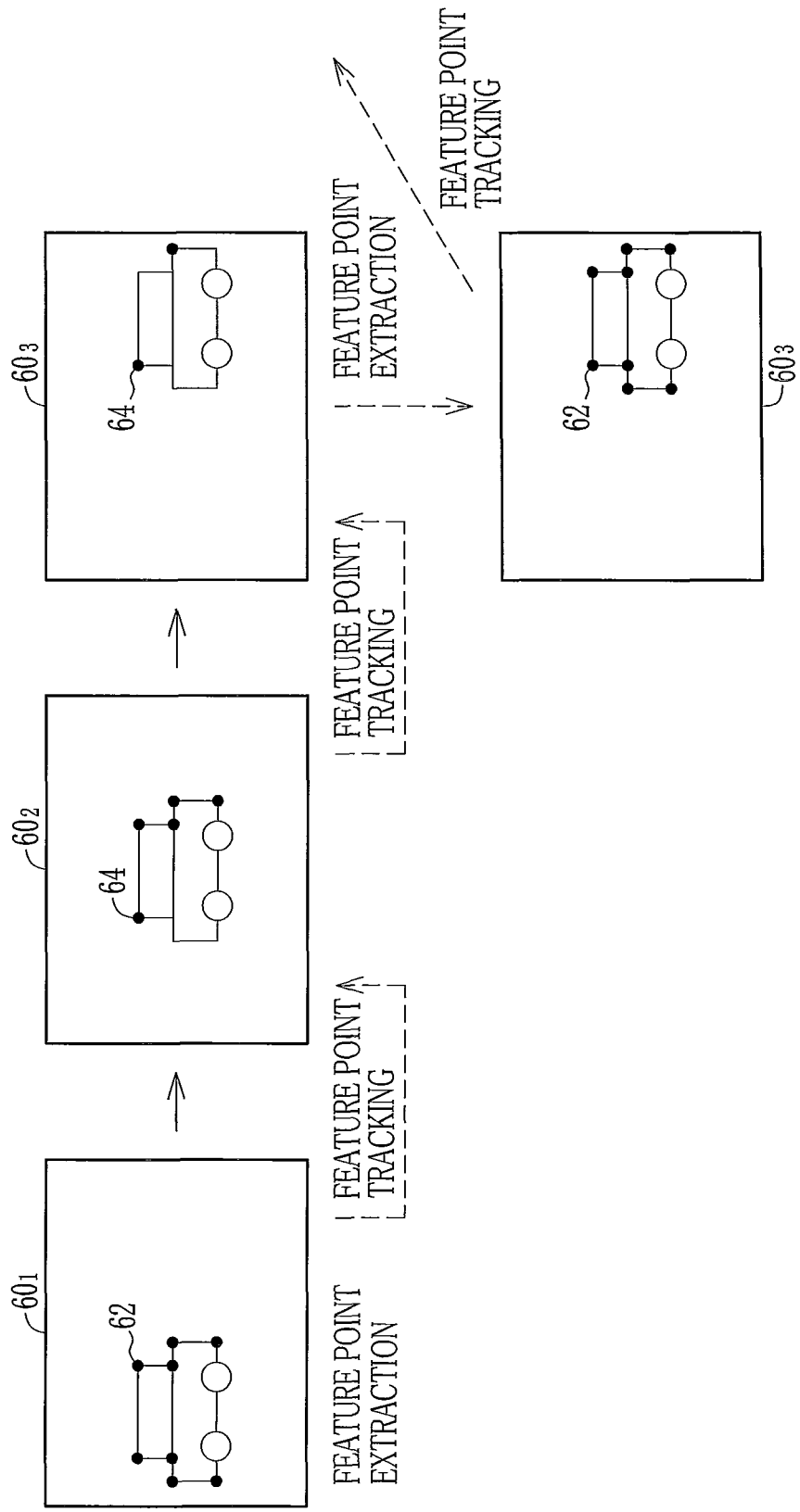
FIG. 15 is an explanatory diagram illustrating the embodiment of FIG. 14.

In contrast, according to the embodiment of FIGS. 14 and 15, corresponding points 64 detected in a second image frame $60_2$, which correspond to feature points 62 extracted in a first image frame $60_1$, are used as feature points 62 for detecting corresponding points in a third image frame $60_3$, insofar as a sufficient number of corresponding points 64 are detected, i.e. the number of traceable feature points 62 is large enough. Consequently, displacement of the corresponding points 64 from the respective feature points 62 is only limited to the amount of image variation between adjacent image frames. Therefore, the corresponding points 64 are less likely to get out of the tracking range of the feature points 62, while the correlation between the feature points 62 and the corresponding points 64 is maintained obvious across a sequence of image frames.

Figure 16:
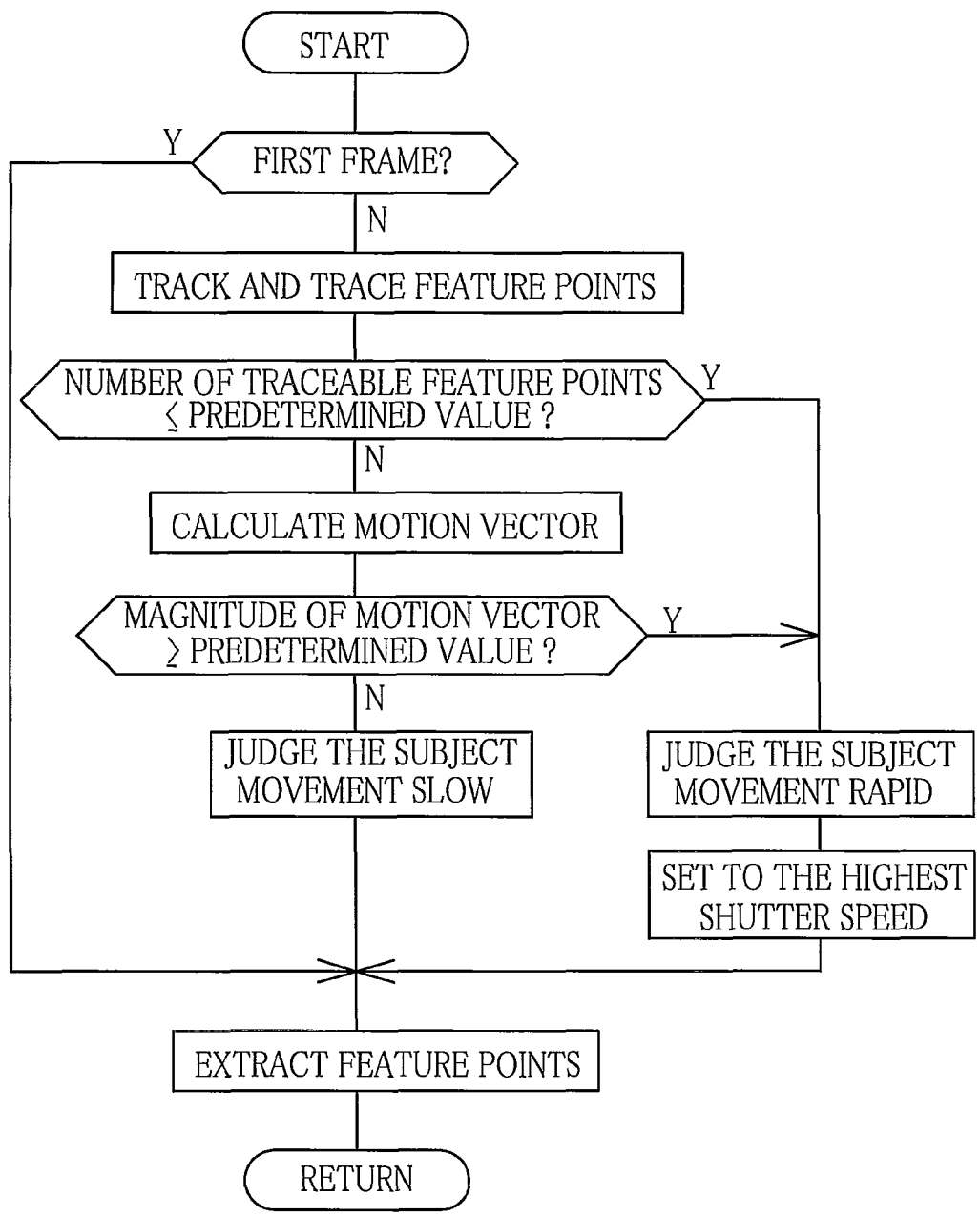
FIG. 16 is a flowchart illustrating an embodiment calculating motion vectors when the number of traceable feature points is not more than a predetermined value.

Referring now to FIG. 16, a further embodiment of the present invention will be described. In the same way as the above-described embodiments, when image data is obtained from a CCD 36, a CPU 34 processes the image data to display an image frame as the through image on the LCD 20. Simultaneously, the CPU 34 determines whether the image data is of an initial or first image frame or not. When the image data is of the first image frame, the CPU 34 commands the feature point extractor 57 to execute the feature point extracting process.

In response to the command for the feature point extracting process from the CPU 34, the feature point extractor 57 reads out the YC converted image data of the first image frame from the SDRAM 45 and extracts multiple feature points 62 from the image data of the first frame. After extracting the feature points 62, the feature point extractor 57 produces data of the feature points 62 and outputs the feature point data to the feature point tracker 58. The feature point tracker 58 writes the received feature point data in the feature point data memory 59.

When image data of a second image frame is obtained from the CCD 36, the CCD 34 commands the feature point tracker 58 to execute the feature point tracking process to the image data, while controlling displaying the second image frame as the through image on the LCD 20. On receiving the command for the feature point tracking process from the CPU 34, the feature point tracker 58 reads out the YC converted image data from the SDRAM 45, and compares the read image data with the feature point data stored in the feature point data memory 59, to identify corresponding points 64 within the second frame. After finding the respective corresponding points 64, the feature point tracker 58 feeds data of the corresponding points 64 to the CPU 34.

On receiving the corresponding point data from the feature point tracker 58, the CPU 34 determines on the basis of the corresponding point data whether the number of traceable feature points 62 whose corresponding points 64 were found by the feature point tracker 58 is more than the predetermined value or not. When the number of traceable feature points 62 is not more than the predetermined value, the CPU 34 determines that the movement of the subject is rapid and raises the shutter speed of the CCD 36 up to a maximum level.

On the other hand, when the number of traceable feature points 62 is above the predetermined value, the CPU 34 reads out the feature point data from the feature point data memory 59 of the feature point tracker 58. Then the CPU 34 calculates motion vectors of the individual traceable feature points 62 from the respective positions of the feature points 62 and the corresponding points 64 based on the feature point data and the corresponding point data. After calculating the motion vectors of the traceable feature points 62, the CPU 34 picks up the largest motion vector among these motion vectors to compare the magnitude or length of the largest motion vector with a predetermined value.

When the motion vector magnitude is less than the predetermined value, the CPU 34 determines that the subject movement is slow. On the other hand, when the motion vector magnitude is not less than the predetermined value, the CPU 34 determines that the subject is moving fast and raises the shutter speed of the CCD 36 up to a maximum level in the same way as when the number of traceable feature points 62 is not more than the predetermined value.

After judging whether the number of traceable feature points 62 is more than the predetermined value or not and whether the motion vector magnitude is less the predetermined value or not, and setting up the shutter speed if necessary, the CPU 34 controls the feature point extractor 57 to extract feature points from the image data that has just been subjected to the feature point tracking process at the feature point tracker 58, to update the feature point data stored in the feature point data memory 59 of the feature point tracker 58.

Calculating the motion vectors of the traceable feature points 62 and determining that the speed of movement of the subject is high when the largest motion vector is not less than the predetermined value will help more accurate judgment on the subject movement in combination with the judgment by the number of traceable feature points. In the embodiment of FIG. 16, the magnitude of the largest motion vector is compared with the predetermined value. Instead of that, it is possible to average the motion vectors and compare the averaged value with a predetermined value.

Next, an embodiment of the present invention will be described with reference to the flowchart of FIG. 17 and the explanatory diagram of FIG. 18. In the same way as the above-described embodiments, when image data is obtained from a CCD 36, a CPU 34 processes the image data to display an image frame as the through image on the LCD 20. Simultaneously, the CPU 34 determines whether the image data is of an initial or first image frame or not. When the image data is of the first image frame, the CPU 34 commands the feature point extractor 57 to execute the feature point extracting process.

In response to the command for the feature point extracting process from the CPU 34, the feature point extractor 57 reads out the YC converted image data of the first image frame from the SDRAM 45 and extracts multiple feature points 62 from the image data of the first frame. After extracting the feature points 62, the feature point extractor 57 produces data of the feature points 62 and outputs the feature point data to the feature point tracker 58. The feature point tracker 58 writes the received feature point data in the feature point data memory 59.

When image data of a second image frame is obtained from the CCD 36, the CCD 34 commands the feature point tracker 58 to execute the feature point tracking process to the image data, while controlling displaying the second image frame as the through image on the LCD 20. On receiving the command for the feature point tracking process from the CPU 34, the feature point tracker 58 reads out the YC converted image data from the SDRAM 45, and compares the read image data with the feature point data stored in the feature point data memory 59, to identify corresponding points 64 within the second frame. After finding the respective corresponding points 64, the feature point tracker 58 feeds data of the corresponding points 64 to the CPU 34. The feature point tracker 58 also feeds the feature point data from the feature point data memory 59 to the CPU 34.

On receiving the feature point data and the corresponding point data from the feature point tracker 58, the CPU 34 calculates motion vectors of the individual traceable feature points 62 based on the feature point data and the corresponding point data. Among the calculated motion vectors of the traceable feature points 62, the CPU 34 picks up the largest motion vector to compare the magnitude or length of the largest motion vector with a predetermined value.

When the motion vector magnitude is not less than the predetermined value, the CPU 34 determines that the subject is moving fast and raises the shutter speed of the CCD 36 up to a maximum level. On the other hand, when the motion vector magnitude is less than the predetermined value, the CPU 34 determines that the subject movement is slow.

Judging that the subject movement is slow, the CPU 34 then determines on the basis of the corresponding point data whether the number of traceable feature points 62 is more than the predetermined value or not. When the number of traceable feature points 62 is not more than the predetermined value, the CPU 34 determines that some of feature points are missing because the target subject corresponding to the feature points 62 is occluded or hidden by other object, as shown for example in a second frame $60_2$ in FIG. 18.

Upon judging that the occlusion occurs, the CPU 34 alerts the user to the occlusion, displaying an alerting message on the LCD 20 or giving an alarm from a not-shown speaker of the camera 2.

The CPU 34 determines whether the motion vector magnitude is less than the predetermined value or not, and carries out the shutter speed adjustment or the alert to the occlusion as necessary. Thereafter the CPU 34 controls the feature point extractor 57 to extract feature points from the image data, from which the feature point tracker 58 has detected the corresponding points, and rewrite the feature point data stored in the feature point data memory 59 of the feature point tracker 58.

Thus, even while the subject movement is judged slow because of the smaller motion vector magnitude than the predetermined value, if the number of traceable feature points 62 goes down to the predetermined value or less, the camera 2 determines that an occlusion of the target subject occurs, and alerts it. Thus, the user can avoid from taking a shot in the situation where the desired subject is hidden by some obstacle. This function is especially useful for the self-timer shooting where the user cannot look at the through image on the LCD 20.

Such an occlusion can sometimes be solved as the obstacle hiding the corresponding part to the feature points 62 moves away from the target object. Therefore, in one embodiment, if it is determined that the occlusion occurs in the self-timer shooting, the camera 2 does not execute an actual shooting even when a given period of time is over, until the occlusion is solved, i.e. the hidden feature points 62 are identified again, so that the camera 2 may record an image after the occlusion is solved.

Figure 19:
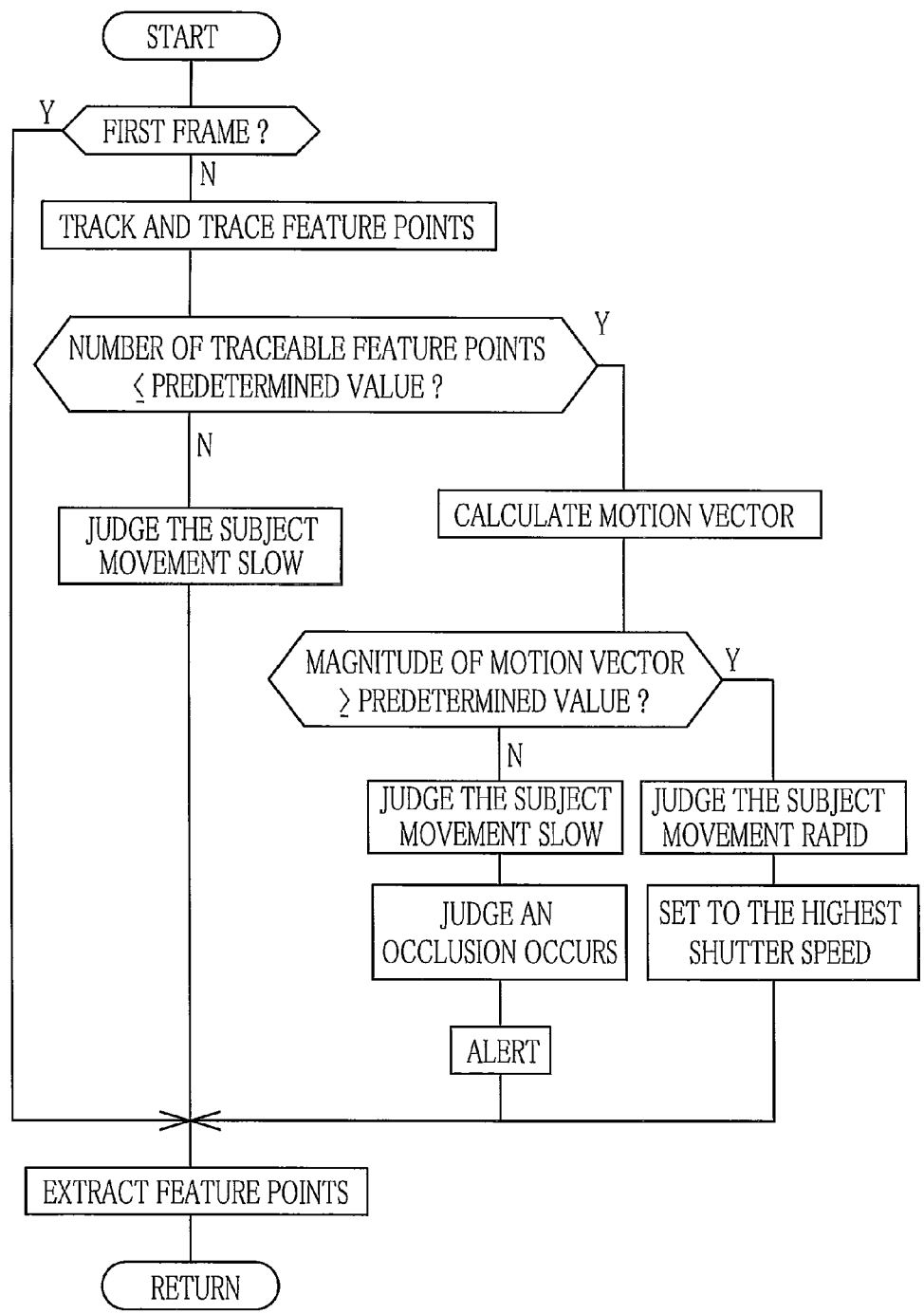
FIG. 19 is a flowchart illustrating another embodiment for detecting occlusion of target feature points.

Next, an embodiment illustrated by the flowchart in FIG. 19 will be described. In the same way as the above-described embodiments, when image data is obtained from a CCD 36, a CPU 34 processes the image data to display an image frame as the through image on the LCD 20. Simultaneously, the CPU 34 determines whether the image data is of an initial or first image frame or not. When the image data is of the first image frame, the CPU 34 commands the feature point extractor 57 to execute the feature point extracting process.

In response to the command for the feature point extracting process from the CPU 34, the feature point extractor 57 reads out the YC converted image data of the first image frame from the SDRAM 45 and extracts multiple feature points 62 from the image data of the first frame. After extracting the feature points 62, the feature point extractor 57 produces data of the feature points 62 and outputs the feature point data to the feature point tracker 58. The feature point tracker 58 writes the received feature point data in the feature point data memory 59.

When image data of a second image frame is obtained from the CCD 36, the CCD 34 commands the feature point tracker 58 to execute the feature point tracking process to the image data, while controlling displaying the second image frame as the through image on the LCD 20. On receiving the command for the feature point tracking process from the CPU 34, the feature point tracker 58 reads out the YC converted image data from the SDRAM 45, and compares the read image data with the feature point data stored in the feature point data memory 59, to identify corresponding points 64 within the second frame. After finding the respective corresponding points 64, the feature point tracker 58 feeds data of the corresponding points 64 to the CPU 34.

On receiving the corresponding point data from the feature point tracker 58, the CPU 34 determines on the basis of the corresponding point data whether the number of traceable feature points 62 is more than the predetermined value or not. When the number of traceable feature points 62 is more than the predetermined value, the CPU 34 determines that the movement of the subject is slow.

On the other hand, when the number of traceable feature points 62 is not more than the predetermined value, the CPU 34 reads out the feature point data from the feature point data memory 59 of the feature point tracker 58. Then the CPU 34 calculates motion vectors of the individual traceable feature points 62 from the respective positions of the traceable feature points 62 and the corresponding points 64 based on the feature point data and the corresponding point data. Among the calculated motion vectors, the CPU 34 picks up the largest motion vector to compare the magnitude of the largest motion vector with a predetermined value.

When the motion vector magnitude is not less than the predetermined value, the CPU 34 determines that the subject is moving fast and raises the shutter speed of the CCD 36 up to a maximum level. On the other hand, when the motion vector magnitude is less than the predetermined value, the CPU 34 determines that the subject movement is slow. At the same time, the CPU 34 determines that an occlusion occurs, and alerts the user to the occurrence of occlusion, displaying the message on the LCD 20 or giving the alarm from a not-shown speaker of the camera 2.

Thus, the CPU 34 carries out the shutter speed adjustment or the alert to the occlusion if it is determined necessary as a result of the judgment based on the number of traceable feature points 92 and the judgment based on the motion vector magnitude. Thereafter the CPU 34 controls the feature point extractor 57 to extract feature points from the image data, from which the feature point tracker 58 has detected the corresponding points, and rewrite the feature point data memory 59 of the feature point tracker 58 with data of the newly extracted feature points.

Figure 17:
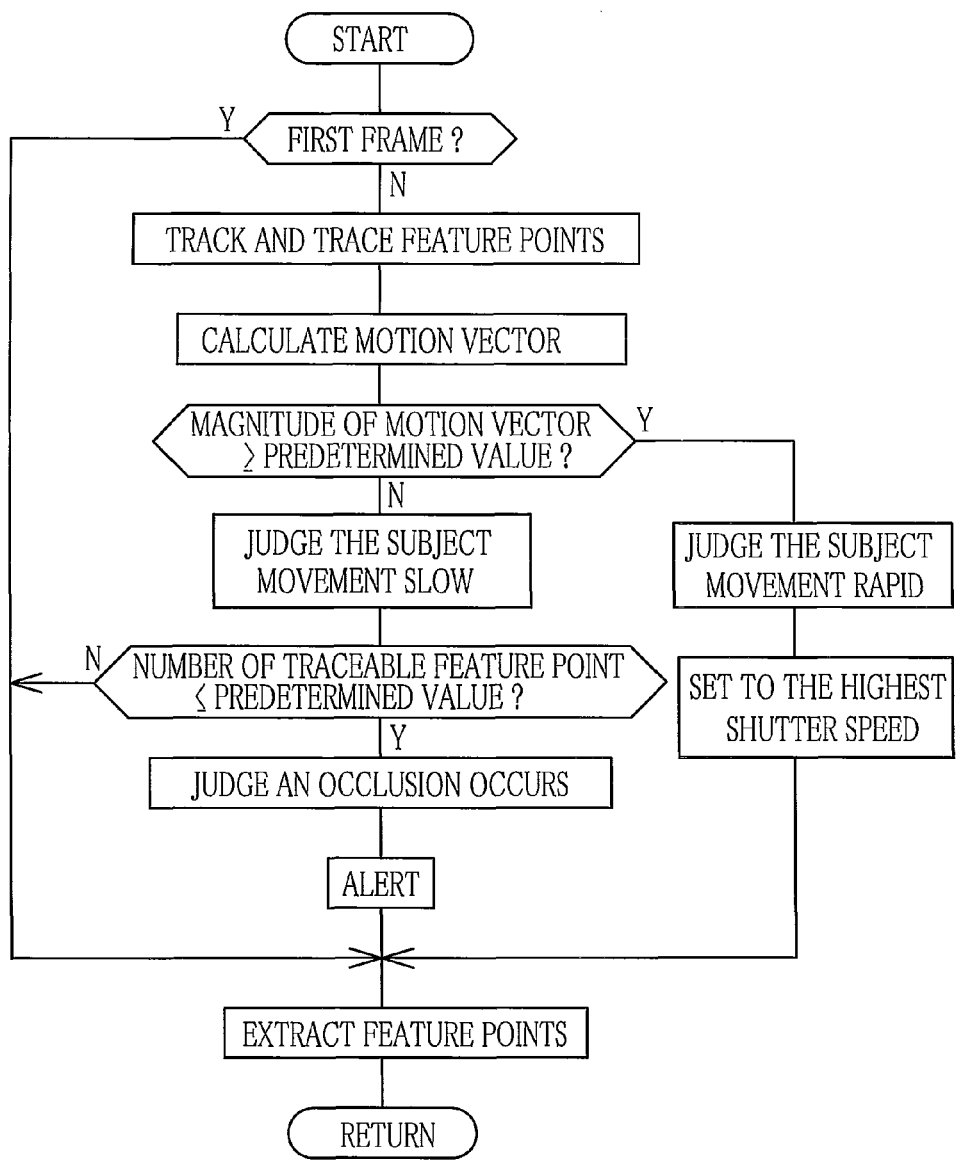
FIG. 17 is a flowchart illustrating an embodiment for detecting occlusion of target feature points.
Figure 18:
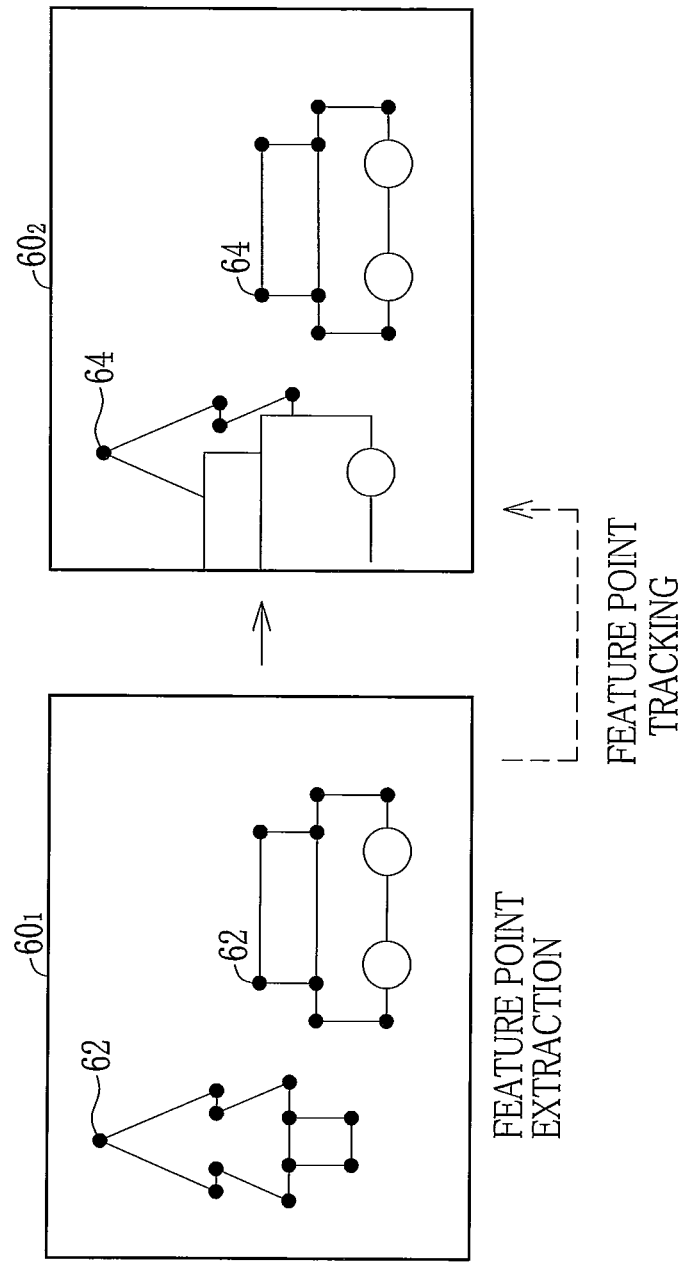
FIG. 18 is an explanatory diagram illustrating an example of successive images in which several feature points are occluded.

In the embodiment of FIGS. 17 and 18, when the motion vector magnitude is smaller than a predetermined value, the number of traceable feature points 62 is compared with a predetermined value to determine that an occlusion occurs if the number of traceable feature points 62 is not more than the predetermined value. On the other hand, according to the embodiment of FIG. 19, when the number of traceable feature points 62 is not more than a predetermined value, the motion vector magnitude is compared with a predetermined value to determine that an occlusion occurs if the motion vector magnitude is less than the predetermined magnitude. Accordingly, both of these embodiments determine that the occlusion occurs when the number of traceable feature points 62 is not more than the predetermined number and the motion vector magnitude is less than the predetermined magnitude, though the sequence of these judgment steps is changed. Thus the same effect will be achieved by the embodiment of FIG. 19 as the embodiment of FIGS. 17 and 18.

Hereinafter, another embodiment of the present invention will be described with reference to the flowchart of FIG. 20. In the same way as the above-described embodiments, when image data is obtained from a CCD 36, a CPU 34 processes the image data to display an image frame as the through image on the LCD 20. Simultaneously, the CPU 34 determines whether the image data is of an initial or first image frame or not. When the image data is of the first image frame, the CPU 34 commands the feature point extractor 57 to execute the feature point extracting process.

In response to the command for the feature point extracting process from the CPU 34, the feature point extractor 57 reads out the YC converted image data of the first image frame from the SDRAM 45 and extracts multiple feature points 62 from the image data of the first frame. After extracting the feature points 62, the feature point extractor 57 produces data of the feature points 62 and outputs the feature point data to the feature point tracker 58. The feature point tracker 58 writes the received feature point data in the feature point data memory 59.

When image data of a second image frame is obtained from the CCD 36, the CCD 34 commands the feature point tracker 58 to execute the feature point tracking process to the image data, while controlling displaying the second image frame as the through image on the LCD 20. On receiving the command for the feature point tracking process from the CPU 34, the feature point tracker 58 reads out the YC converted image data from the SDRAM 45, and compares the read image data with the feature point data stored in the feature point data memory 59, to identify corresponding points 64 within the second frame. After finding the respective corresponding points 64, the feature point tracker 58 feeds data of the corresponding points 64 to the CPU 34. The feature point tracker 58 also feeds the feature point data from the feature point data memory 59 to the CPU 34.

On the basis of the feature point data and the corresponding point data from the feature point tracker 58, the CPU 34 extracts the untraceable feature points 62 whose corresponding points 64 could not be found by the feature point tracker 58. After extracting the untraceable feature points 62, the CPU 34 weights the untraceable feature points 62 with values predetermined according to locations within the image frame 60. Then the CPU 34 calculates an integral weight of the untraceable feature points 62, accumulating the weighted values of all untraceable feature points 62. For example, the heaviest weight may be given to the feature points existing in a central area of the image frame 60 and the weight may gradually decrease toward the peripheral area of the image frame 60.

After calculating the integral weight of the untraceable feature points 62, the CPU 34 compares the integral weight with a predetermined value or not. When the product of weight is less than the predetermined value, the CPU 34 determines that the subject movement is slow. On the other hand, when the product of weight is not less than the predetermined value, the CPU 34 determines that the subject is moving fast and raises the shutter speed of the CCD 36 up to a maximum level After judging whether the number of traceable feature points 62 is more than the predetermined value or not and whether the motion vector magnitude is less the predetermined value or not, and setting up the shutter speed if necessary, the CPU 34 controls the feature point extractor 57 to extract feature points from the image data that has just been subjected to the feature point tracking process at the feature point tracker 58, to update the feature point data stored in the feature point data memory 59 of the feature point tracker 58.

Judging the speed of movement of the subject only by the number of traceable or untraceable feature points 62 can lead to judging that the speed of movement of the subject is high not only when the target or main subject actually moves fast, but also when other object or objects having no substantial influence on the image, such as background objects, move fast or an occlusion occurs in the background. In that case, the imaging condition of the camera can be changed unnecessarily or unexpectedly.

Figure 20:
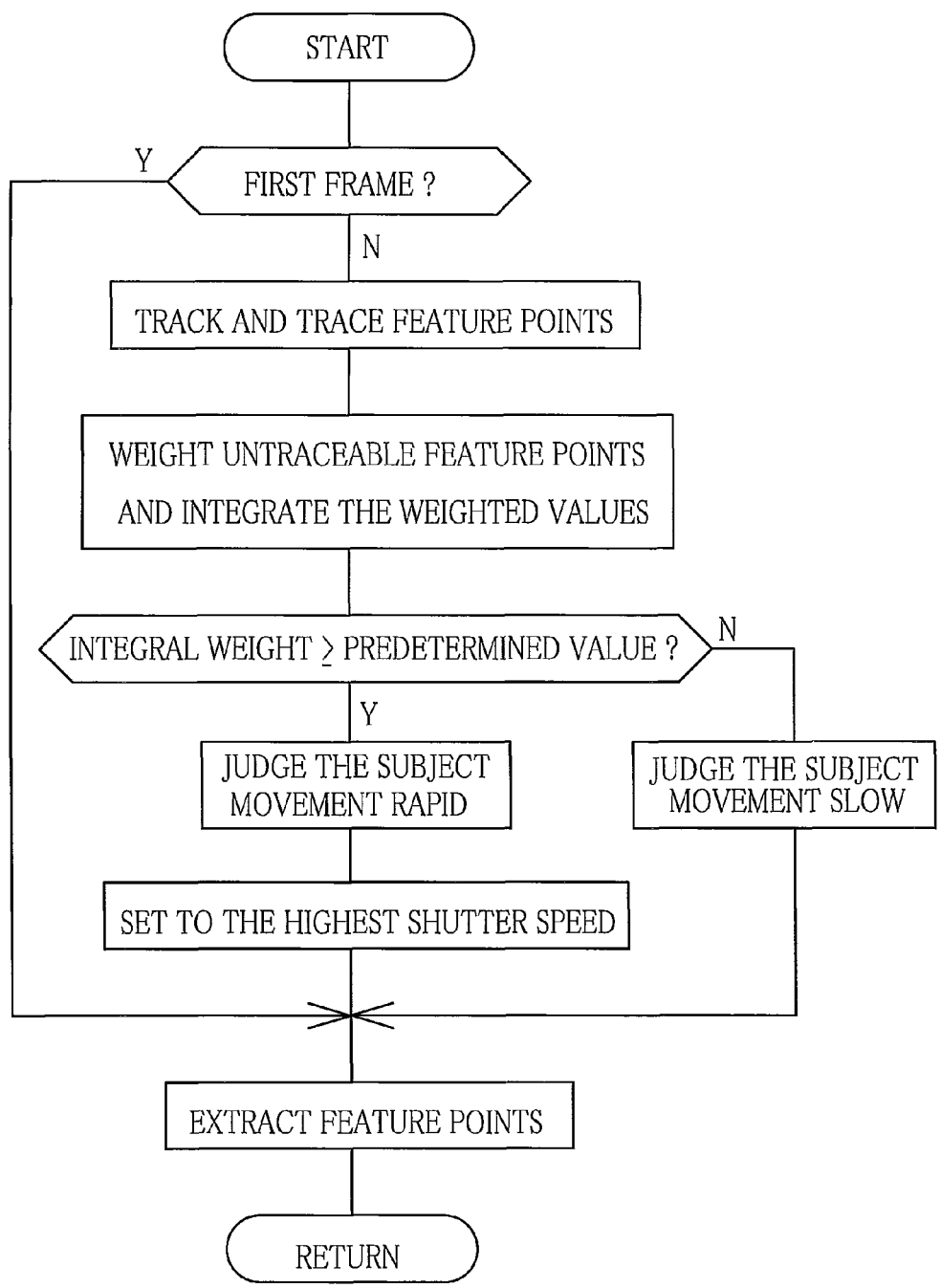
FIG. 20 is a flowchart illustrating an embodiment, wherein untraceable feature points are weighted according to their locations within the frame.

In contrast, the embodiment of FIG. 20 is configured to weight the untraceable feature points according to their locations within the image frame such that less important feature points have smaller influence on the judgment about the subject movement. As a result, more accurate judgment about the subject movement is enabled. Note that the location of highly weighted feature points is not necessarily limited to the central area of the image frame. For example, it is possible to put heavier weight on a face area or face areas which may be detected by a well-known face detection process or on an area containing a target being automatically tracked. Instead of weighting the untraceable feature points, it is possible to weight the traceable feature points.

Referring now to the flowchart of FIG. 21, another embodiment of the present invention will be described. In a digital camera 2 of this embodiment, a CCD 36 has a plurality of pixels for phase difference detection, which selectively separate the light falling onto the CCD 36 into different angles to enable executing phase-detection AF (auto-focusing) process. The digital camera 2 can also selectively switch over the AF process between phase-detection mode and contrast-detection mode.

In the same way as the above-described embodiments, when image data is obtained from a CCD 36, a CPU 34 processes the image data to display an image frame as the through image on the LCD 20. Simultaneously, the CPU 34 determines whether the image data is of an initial or first image frame or not. When the image data is of the first image frame, the CPU 34 commands the feature point extractor 57 to execute the feature point extracting process.

In response to the command for the feature point extracting process from the CPU 34, the feature point extractor 57 reads out the YC converted image data of the first image frame from the SDRAM 45 and extracts multiple feature points 62 from the image data of the first frame. After extracting the feature points 62, the feature point extractor 57 produces data of the feature points 62 and outputs the feature point data to the feature point tracker 58. The feature point tracker 58 writes the received feature point data in the feature point data memory 59.

When image data of a second image frame is obtained from the CCD 36, the CCD 34 commands the feature point tracker 58 to execute the feature point tracking process to the image data, while controlling displaying the second image frame as the through image on the LCD 20. On receiving the command for the feature point tracking process from the CPU 34, the feature point tracker 58 reads out the YC converted image data from the SDRAM 45, and compares the read image data with the feature point data stored in the feature point data memory 59, to identify corresponding points 64 within the second frame. After finding the respective corresponding points 64, the feature point tracker 58 feeds data of the corresponding points 64 to the CPU 34.

On receiving the corresponding point data from the feature point tracker 58, the CPU 34 determines on the basis of the corresponding point data whether the number of traceable feature points 62 whose corresponding points 64 were found by the feature point tracker 58 is more than the predetermined value or not. When the number of traceable feature points 62 is more than the predetermined value, the CPU 34 determines that the movement of the subject is slow and sets the digital camera 2 to the contrast-detection AF mode to make more accurate focusing. On the other hand, when the number of traceable feature points 62 is not more than the predetermined value, the CPU 34 determines that the movement of the subject is rapid and sets the digital camera 2 to the phase-detection AF mode where the focusing is made quicker than the contrast-detection AF mode.

Thus, the CPU 34 determines whether the number of traceable feature points 62 is more than the predetermined value or not to set the digital camera 2 to the contrast detection AF mode or the phase detection AF mode. Thereafter the CPU 34 controls the feature point extractor 57 to extract feature points from the image data, from which the feature point tracker 58 has detected the corresponding points, and rewrite the feature point data memory 59 of the feature point tracker 58 with data of the newly extracted feature points.

Upon an instruction to execute the preparatory operation for a shot, which is entered by half-press of a shutter release button 14, the CPU 34 carries out the AF process in the mode selected as above. Consequently, when the speed of movement of the subject is high, the speed-oriented phase-detection AF process is automatically carried out, so that the camera 2 can take a properly focused image without missing the optimum timing in spite of the rapidly moving subject.

Figure 21:
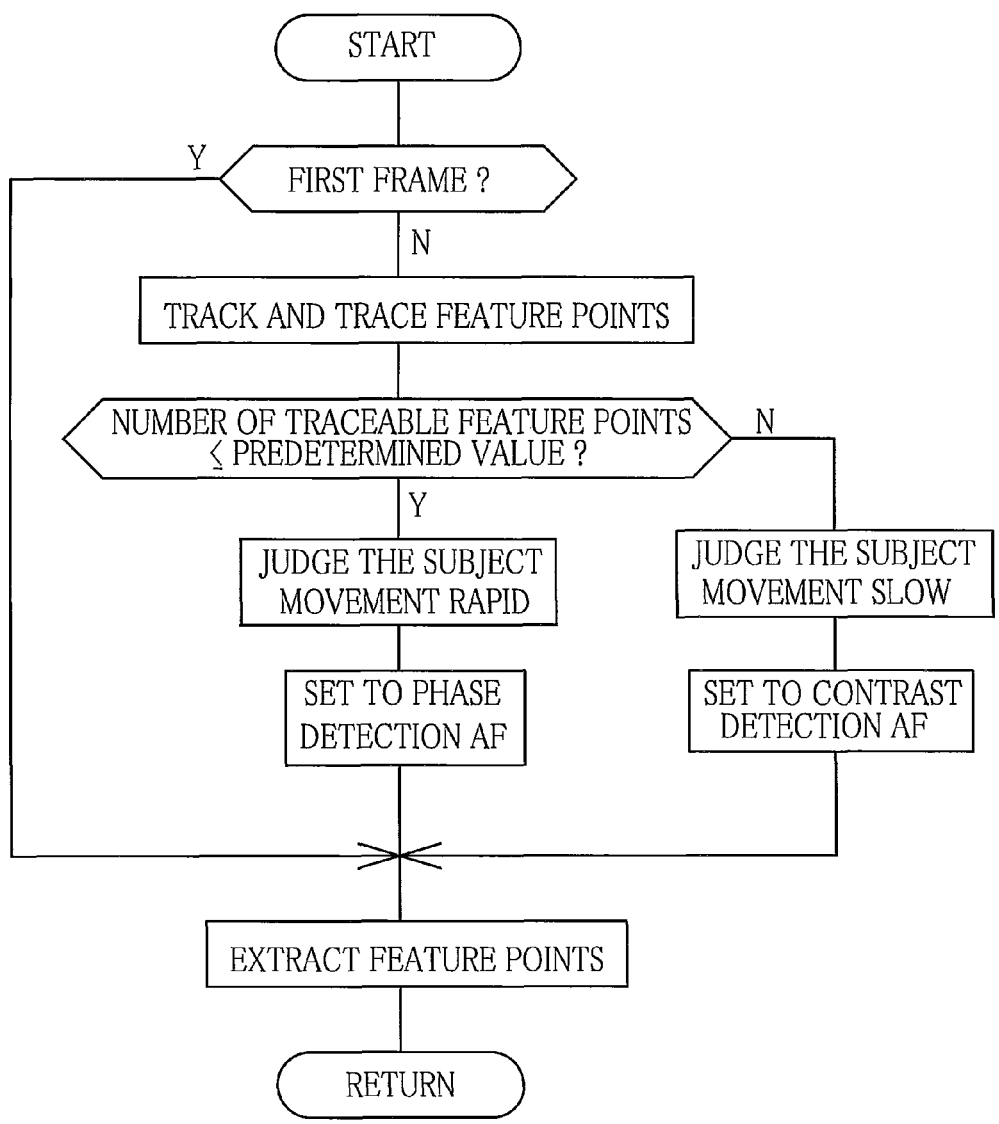
FIG. 21 is a flowchart illustrating an embodiment, wherein AF mode of the digital camera is switched depending upon the speed of movement of the subject.

Although the embodiment depicted in FIG. 21 selectively uses the contrast-detection AF and the phase-detection AF, the selectable AF modes are not limited to these. For example, it is possible to provide the digital camera 2 with a range sensor for measuring the distance to the subject, and select the active AF process using the range sensor when the subject movement is judged rapid, or select the contrast-detection AF when the subject movement is judged slow. Moreover, it is possible to prepare a plurality of contrast-detection AF modes with different search steps, so that a contrast-detection AF process with finer search steps may be selected when the subject movement is slow, and a contrast-detection AF process with rougher search steps when the speed of movement of the subject is high.

Furthermore, the number of the AF process methods is not limited to two, but it is possible to prepare three and more AF modes. In this case, when the speed of movement of the subject is high, the camera may be set to the AF mode that can achieve the highest focusing speed among all, or the mode with one rank above the current AF mode with respect to the focusing speed.

Figure 22:
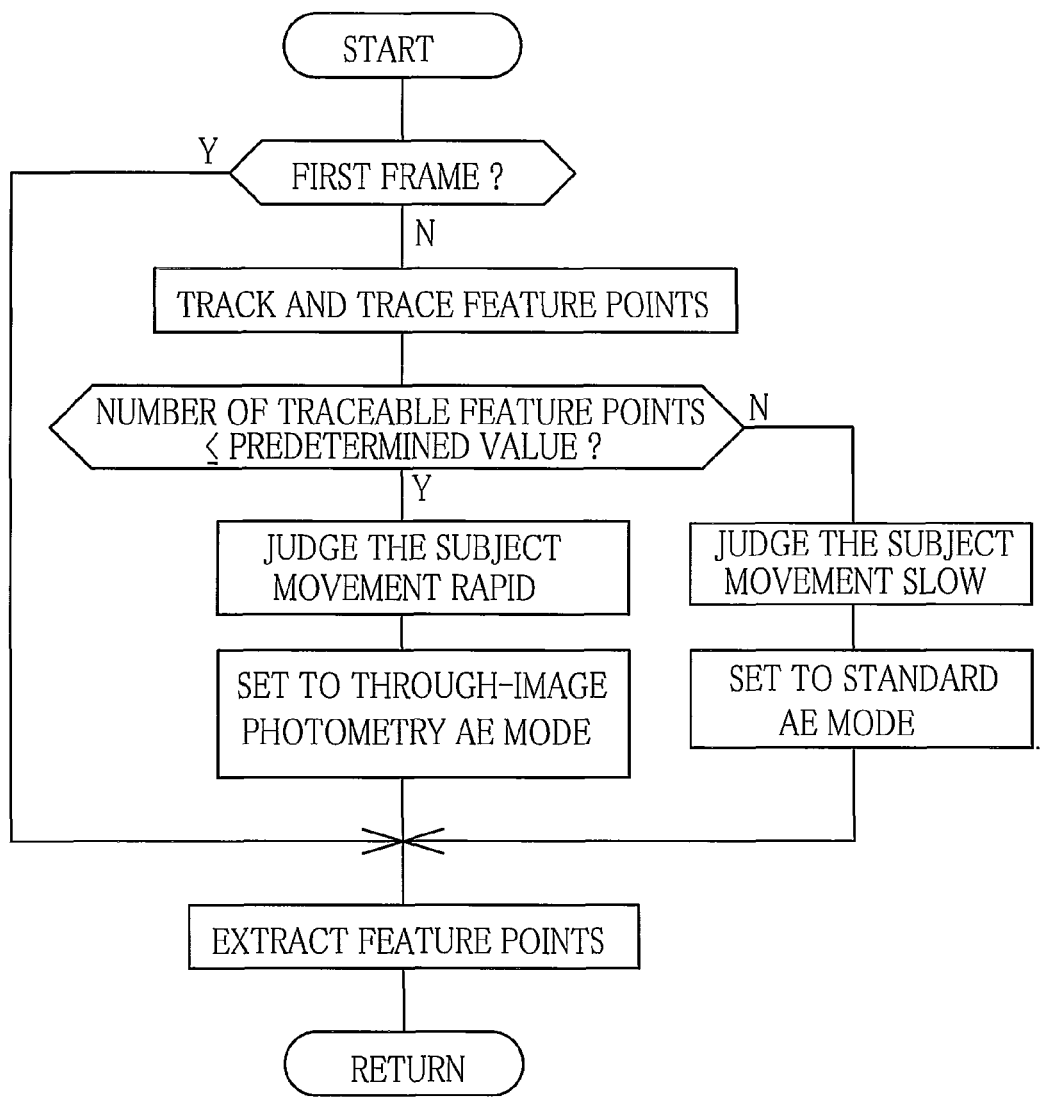
FIG. 22 is a flowchart illustrating an embodiment, wherein AE mode of the digital camera is switched depending upon the speed of movement of the subject.

Next, a still another embodiment of the present invention will be described with reference to the flowchart in FIG. 22. In the same way as the above-described embodiments, when image data is obtained from a CCD 36, a CPU 34 processes the image data to display an image frame as the through image on the LCD 20. Simultaneously, the CPU 34 determines whether the image data is of an initial or first image frame or not. When the image data is of the first image frame, the CPU 34 commands the feature point extractor 57 to execute the feature point extracting process.

In response to the command for the feature point extracting process from the CPU 34, the feature point extractor 57 reads out the YC converted image data of the first image frame from the SDRAM 45 and extracts multiple feature points 62 from the image data of the first frame. After extracting the feature points 62, the feature point extractor 57 produces data of the feature points 62 and outputs the feature point data to the feature point tracker 58. The feature point tracker 58 writes the received feature point data in the feature point data memory 59.

When image data of a second image frame is obtained from the CCD 36, the CCD 34 commands the feature point tracker 58 to execute the feature point tracking process to the image data, while controlling displaying the second image frame as the through image on the LCD 20. On receiving the command for the feature point tracking process from the CPU 34, the feature point tracker 58 reads out the YC converted image data from the SDRAM 45, and compares the read image data with the feature point data stored in the feature point data memory 59, to identify corresponding points 64 within the second frame. After finding the respective corresponding points 64, the feature point tracker 58 feeds data of the corresponding points 64 to the CPU 34.

On receiving the corresponding point data from the feature point tracker 58, the CPU 34 determines on the basis of the corresponding point data whether the number of traceable feature points 62 whose corresponding points 64 were found by the feature point tracker 58 is more than the predetermined value or not. When the number of traceable feature points 62 is more than the predetermined value, the CPU 34 determines that the movement of the subject is slow and sets the digital camera 2 to a standard AE mode. On the other hand, when the number of traceable feature points 62 is not more than the predetermined value, the CPU 34 determines that the movement of the subject is rapid and sets the digital camera 2 to a through-image photometry AE mode where the exposure value is decided by a subject brightness measured from an image frame of the through-image, which is displayed at the moment or immediately before a shutter release button 14 is fully pressed to enter an instruction to take a shot, i.e. record an image.

Thus, the CPU 34 determines whether the number of traceable feature points 62 is more than the predetermined value or not to set the digital camera 2 to the standard AE mode or the through-image photometry AE mode. Thereafter the CPU 34 controls the feature point extractor 57 to extract feature points from the image data, from which the feature point tracker 58 has detected the corresponding points, and rewrite the feature point data memory 59 of the feature point tracker 58 with data of the newly extracted feature points.

When the shutter release button 14 is fully pressed down to give an instruction to take a shot, the CPU 34 captures and records an image at an exposure value determined through the AE mode selected as above. Because the through-image photometry AE is effective to reduce the shutter time lag, i.e. the time lag from the full-press of the shutter release button 14 to the actual shooting, it is advantageous to set the camera 2 automatically to the through-image photometry AE mode when the speed of movement of the subject is high. Thereby, even while the subject is moving fast, the camera 2 can record an image with a minimum time lag from the desired shutter chance.

According to the above-described embodiments, the feature point extracting process is carried out to the image data of every image frame to be displayed as the through image. Instead of this, feature points may be extracted from every few image frames, e.g. from every second, third, or fourth image frame.

In the above-described embodiments, the present invention is applied to a digital camera 2. However, the present invention is not limited to the digital camera 2 but also applicable to other cases, for example, where the movement of a subject contained in a sequence of previously obtained image data is analyzed on a computer or the like.

According to the above-described embodiments, the feature point tracker 58 tracks the movement of feature points 62 by detecting corresponding points 64 to these feature points 62 in a succeeding image frame that is obtained after the image frame from which the feature points 62 are extracted. Alternatively, it is possible to detect corresponding points 64 in a preceding image frame that was obtained before the image frame from which the feature points 62 are extracted. In other words, the feature point tracker 58 may be configured to execute the feature point tracking process to those image data obtained either before or after the image data to which the feature point extractor 57 executes the feature point extracting process.

The present invention has been described so far with respect to the preferred embodiments. It should be understood that the embodiments have been disclosed for illustrative purposes only. Those skilled in the art will appreciate that various modifications, additions and substitutions of these embodiments are possible without departing from the scope and spirit of the invention as disclosed in the accompanying claims.

What is claimed is:

1. An imaging apparatus that can drive an image sensor to capture a series of image frames time-sequentially, said imaging apparatus comprising:
    a feature point extracting device that extracts a plurality of feature points from a first image frame captured through said image sensor;
    a feature points tracking device for tracking the feature points extracted by said feature point extracting device, said feature point tracking device identifying corresponding points to the extracted feature points in a second image frame captured before or after the first image frame; and
    a movement judging device that judges whether the speed of movement of a common subject contained in the first and second image frames is high or low, depending upon the number of traceable feature points to which said feature point tracking device can identify the corresponding points, or the number of untraceable feature points to which said feature point tracking device cannot identify the corresponding points, wherein said movement judging device judges that the speed of movement of the subject is high when the number of traceable feature points is not more than a predetermined value.

2. The imaging apparatus as recited in claim 1, further comprising an imaging condition changing device that changes the imaging condition of said imaging apparatus to be appropriate for a moving subject when said movement judging device judges that the subject is moving fast.

3. The imaging apparatus as recited in claim 2, wherein said imaging condition changing device raises the shutter speed of said image sensor up to a value appropriate for a moving subject when said movement judging device judges that the subject is moving fast.

4. The imaging apparatus as recited in claim 2, wherein said imaging condition changing device raises the frame rate of said image sensor up to a value appropriate for a moving subject when said movement judging device judges that the subject is moving fast.

5. The imaging apparatus as recited in claim 2, wherein said imaging condition changing device sets said imaging apparatus to an image-capturing mode appropriate for a moving subject when said movement judging device judges that the subject is moving fast.

6. The imaging apparatus as recited in claim 2, wherein said imaging condition changing device sets said imaging apparatus to a continuous shooting mode for recording still images in continuous succession upon a command to take a shot when said movement judging device judges that the subject is moving fast.

7. The imaging apparatus as recited in claim 2, further comprising a taking lens for forming an image of a subject on said image sensor, and an AF control device for adjusting focus of said taking lens to a variable subject distance, said AF control device having different operation modes with different focusing speeds, wherein said imaging condition changing device sets said AF control device to a mode that achieves a higher focusing speed when said movement judging device judges that the subject is moving fast.

8. The imaging apparatus as recited in claim 2, further comprising an AE control device having a standard AE mode for controlling an exposure based on a photometric value obtained upon an instruction to take a shot, and a through-image photometry AE mode for controlling an exposure based on a photometric value that has been obtained from a through-image displayed at the moment or immediately before an instruction to take a shot is entered, wherein said imaging condition changing device sets said AE control device to the through-image photometry AE mode when said movement judging device judges that the subject is moving fast.

9. The imaging apparatus as recited in claim 1, wherein said movement judging device calculates motion vectors of the traceable feature points, and judges that the speed of movement of the subject is high when the magnitude of the largest motion vector is not less than a predetermined value even if the speed of movement of the subject can be judged low with respect to the number of traceable feature points or the number of untraceable feature points.

10. The imaging apparatus as recited in claim 1, wherein said movement judging device calculates motion vectors of the traceable feature points, and judges that some occlusion occurs when the magnitude of the largest motion vector is less than a predetermined value and the number of traceable feature points is not more than a predetermined value.

11. The imaging apparatus as recited in claim 1, wherein said movement judging device weights the traceable or untraceable feature points with values predetermined according to respective locations of these feature points within each image frame, and integrates the weighted values of the feature points, to judge whether the speed of movement of the subject is high or low on the basis of an integral weight of the feature points.

12. An imaging apparatus that can drive an image sensor to capture a series of image frames time-sequentially, said imaging apparatus comprising:
    a feature point extracting device that extracts a plurality of feature points from a first image frame captured through said image sensor;
    a feature points tracking device for tracking the feature points extracted by said feature point extracting device, said feature point tracking device identifying corresponding points to the extracted feature points in a second image frame captured before or after the first image frame; and
    a movement judging device that judges whether the speed of movement of a common subject contained in the first and second image frames is high or low, depending upon the number of traceable feature points to which said feature point tracking device can identify the corresponding points, or the number of untraceable feature points to which said feature point tracking device cannot identify the corresponding points, wherein said movement judging device judges that the speed of movement of the subject is high when the number of untraceable feature points is not less than a predetermined value.

13. An imaging apparatus that can drive an image sensor to capture a series of image frames me-sequentially, said imaging apparatus comprising:
a feature point extracting device that extracts a plurality of feature points from a first image frame captured through said image sensor;
a feature points tracking device for tracking the feature points extracted by said feature point extracting device, said feature point tracking device identifying corresponding points to the extracted feature points in a second image frame captured before or after the first image frame; and
a movement judging device that judges whether the speed of movement of a common subject contained in the first and second image frames is high or low, depending upon the number of traceable feature points to which said feature point tracking device can identify the corresponding points, or the number of untraceable feature points to which said feature point tracking device cannot identify the corresponding points, wherein said movement judging device judges that the speed of movement of the subject is high when the percentage of the number of untraceable feature points is not less than a predetermined value.

14. An imaging apparatus that can drive an image sensor to capture a series of image frames time-sequentially, said imaging apparatus comprising:
a feature point extracting device that extracts a plurality of feature points from a first image frame captured through said image sensor;
a feature points tracking device for tracking the feature points extracted by said feature point extracting device, said feature point tracking device identifying corresponding points to the extracted feature points in a second image frame captured before or after the first image frame; and
a movement judging device that judges whether the speed of movement of a common subject contained in the first and second image frames is high or low, depending upon the number of traceable feature points to which said feature point tracking device can identify the corresponding points, or the number of untraceable feature points to which said feature point tracking device cannot identify the corresponding points, wherein said movement judging device judges that the speed of movement of the subject is high when the percentage of the number of traceable feature points is not more than a predetermined value.

15. An image processing method for tracking the movement of a common subject contained in a series of time-sequentially captured image frames on the basis of image data of the image frames, said image processing method comprising steps of:
extracting a plurality of feature points of the subject from a first one of the series of image frames;
identifying corresponding points to the extracted feature point in a second image frame that is captured before or after the first image frame; and
judging whether the speed of movement of the common subject is high or low, depending upon the number of traceable feature points to which the corresponding points can be identified, or the number of untraceable feature points to which the corresponding points cannot be identified,
wherein the speed of movement of the subject is judged to be high when the number of traceable feature points is not more than a predetermined value.

16. An image processing method as recited in claim 15, further comprising steps of:
comparing the number of traceable feature points with a predetermined value;
extracting a second set of feature points from the second image frame to identify corresponding points to the second set of feature points in a third image frame when the number of traceable feature points is not more than the predetermined value; and
identifying corresponding points to the feature points extracted from the first image frame in the third image frame when the number of traceable feature points is more than the predetermined value.

17. An image processing method as recited in claim 15, further comprising steps of:
comparing the number of traceable feature points with a predetermined value;
extracting a second set of feature points from the second image frame to identify corresponding points to the second set of feature points in a third image frame when the number of traceable feature points is not more than the predetermined value; and
using the corresponding points identified in the second image frame as feature points, to which corresponding points are to be identified in the third image frame, when the number of traceable feature points is more than the predetermined value.

18. An image processing method for tracking the movement of a common subject contained in a series of time-sequentially captured image frames on the basis of image data of the image frames, said image processing method comprising steps of:
extracting a plurality of feature points of the subject from a first one of the series of image frames;
identifying corresponding points to the extracted feature point in a second image frame that is captured before or after the first image frame; and
judging whether the speed of movement of the common subject is high or low, depending upon the number of traceable feature points to which the corresponding points can be identified, or the number of untraceable feature points to which the corresponding points cannot be identified,
wherein the speed of movement of the subject is judged to be high when the number of untraceable feature points is not less than a predetermined value.

19. An image processing method for tracking the movement of a common subject contained in a series of time-sequentially captured image frames on the basis of image data of the image frames, said image processing method comprising steps of:
extracting a plurality of feature points of the subject from a first one of the series of image frames;
identifying corresponding points to the extracted feature point in a second image frame that is captured before or after the first image frame; and
judging whether the speed of movement of the common subject is high or low, depending upon the number of traceable feature points to which the corresponding points can be identified, or the number of untraceable feature points to which the corresponding points cannot be identified, wherein the speed of movement of the subject is judged to be high when the percentage of the number of untraceable feature points is not less than a predetermined value.

20. An image processing method for tracking the movement of a common subject contained in a series of time-sequentially captured image frames on the basis of image data of the image frames, said image processing method comprising steps of:

extracting a plurality of feature points of the subject from a first one of the series of image frames;

identifying corresponding points to the extracted feature point in a second image frame that is captured before or after the first image frame; and judging whether the speed of movement of the common subject is high or low, depending upon the number of traceable feature points to which the corresponding points can be identified, or the number of untraceable feature points to which the corresponding points cannot be identified, wherein the speed of movement of the subject is judged to be high when the percentage of the number of traceable feature points is not more than a predetermined value.

* * * * *